(12) United States Patent
AlSindi et al.

(10) Patent No.: US 9,207,305 B2
(45) Date of Patent: Dec. 8, 2015

(54) METHODS AND DEVICES FOR CHANNEL IDENTIFICATION

(75) Inventors: Nayef AlSindi, Abu Dhabi (AE); James Aweya, Abu Dhabi (AE)

(73) Assignees: Khalifa University of Science, Technology and Research, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 523 days.

(21) Appl. No.: 13/604,063

(22) Filed: Sep. 5, 2012

(65) Prior Publication Data

US 2014/0062793 A1    Mar. 6, 2014

(51) Int. Cl.
| G01S 5/02 | (2010.01) |
| H04B 17/24 | (2015.01) |
| H04B 17/27 | (2015.01) |
| H04B 17/364 | (2015.01) |
| H04B 17/391 | (2015.01) |

(52) U.S. Cl.
CPC .............. G01S 5/0215 (2013.01); H04B 17/24 (2015.01); H04B 17/27 (2015.01); H04B 17/364 (2015.01); H04B 17/391 (2015.01)

(58) Field of Classification Search
CPC ............................ G01S 5/0215; G01S 5/0273
See application file for complete search history.

(56) References Cited

U.S. PATENT DOCUMENTS

| 5,974,329 | A | * | 10/1999 | Wylie et al. | 455/456.1 |
| 7,577,445 | B2 | * | 8/2009 | Guvenc et al. | 455/456.2 |
| 8,406,280 | B2 | * | 3/2013 | Draganov et al. | 375/150 |
| 2008/0175328 | A1 | * | 7/2008 | Lin et al. | 375/260 |
| 2010/0203839 | A1 | * | 8/2010 | Duan et al. | 455/67.11 |
| 2010/0315289 | A1 | * | 12/2010 | Nurmela et al. | G01S 11/06 342/385 |
| 2011/0177786 | A1 | | 7/2011 | Marano et al. | |

FOREIGN PATENT DOCUMENTS

| CA | 2442950 A1 * | 3/2005 | ............ G01S 5/0252 |
| GB | 2445385 | 7/2008 | |

OTHER PUBLICATIONS

Borras et al ("Decision Theoretic Framework for NLOS Identification"), Proc. 48$^{th}$ IEEE Vehicluar Tech. Conf, May 1998.*

(Continued)

*Primary Examiner* — Gregory C Issing
(74) *Attorney, Agent, or Firm* — Calfee Halter & Griswold, LLP

(57) ABSTRACT

This invention relates to methods and devices for channel identification. The invention is particularly concerned with techniques for non-line of sight channel identification. In embodiments of the invention the methods and devices are used for channel identification in wireless geolocation systems. Embodiments of the invention make use of an entropy estimation of the channel to distinguish channel conditions and in particular to identify line-of-sight and non-line-of-sight channels and which can be used to solve the NLOS problem of determining relative distances between transmitter and receiver. In particular embodiments an entropy estimation of the channel impulse response (CIR) is used to construct a robust entropy-based channel identification technique. As a result, more accurate localization in indoor and other multipath environments may be possible.

22 Claims, 12 Drawing Sheets

(56) References Cited

OTHER PUBLICATIONS

Sadough et al ("A Wavelet Packet Based Model for an Ultra-Wide-Band Indoor Propagation Channel"),ECPS 2005 Conference, Mar. 2005, pp. 1-8.*
Couillet et al ("A Maximum Entropy Approach to OFDM Channel Estimation"),"A Maximum Entropy Approach to OFDM Channel Estimation" arXiv.org > cs > arXiv:0811.0778, pp. 1-15, Nov. 2008.*
Guillaud et al ("Maximum Entropy MIMO Wireless Channel Models"), Submitted to IEEE Trans. Information Theory Dec. 2006, arXiv:cs/0612101v1.*
Socheleau et al ("Concise Derivation of Scattering Function from Channel Entropy Maximization") Socheleau, Francois-Xavier, Christophe Laot, and J. Passerieux. "Concise derivation of scattering function from channel entropy maximization." Communications, IEEE Transactions on 58, No. 11 (2010): 3098-3103.*
Guvenc, Ismail et al, "A Survey on TOA Based Wireless Localization and NLOS Mitigation Techniques," IEEE Communications Surveys & Tuorials, vol. 11, No. 3, third quarter 2009, pp. 107-124.*
N. Patel, Strategy Analytics: The $10 Billion Rule: Location, Location, Location, p. 7, Navigation: Wireless Media Strategies, May 20, 2011.
K. Pahlavan, X. Li and J.P. Makela, "Indoor geolocation science and technology," IEEE Communications Magazine, vol. 40, No. 2, pp. 112-118, Feb. 2002.
M. P. Wylie and J. Holtzman, "The non-line of sight problem in mobile location estimation," Proc. 5th IEEE Int. Conf. Universal Personal Communications, vol. 2, pp. 827-831, 1996.
J. Borras, P. Hatrack and N. B. Mandayam, "Decision Theoretic Framework for NLOS Identification," Proc. 48th IEEE Vehicular Technology Conference (VTC98), pp. 1583-1587, vol. 2, Ottawa, Ont. Canada, May 1998.
S. Venkatraman and J. Caffery, Jr., "A statistical approach to non-line-of-sight BS identification," Proc. IEEE 5th Int. Symp. Wireless Personal Multimedia Communications (WPMC 2002), vol. 1, pp. 296-300, 2002.
K. Yu and Y. J. Guo, "Non-line-of-sight detection based on TOA and signal strength," Proc. IEEE 19th Int'l Symp. on Personal, Indoor and Mobile Radio Communications (PIMRC) 2008, pp. 1-5, Sep. 2008.
K. Yu and Y. J. Guo, "Statistical NLOS identification based on AOA, TOA and Signal Strength," IEEE Trans. on Vehicular Tech., vol. 58, No. 1, pp. 274-286, Jan. 2009.
R. Diamant, H.-P. Tan and L. Lampe, "NLOS identification using a hybrid TOA-signal strength for underwater acoustic localization," Proc. IEEE Oceans 2010, pp. 1-7, Sep. 2010.
S. Gezici, H. Kobayashi and H. V. Poor, "Non-parametric non-line-of-sight identification," Proc. IEEE 58th Vehicular Technology Conf. (VTC 2003 Fall), vol. 4, pp. 2544-2548, 2003.
N. Alsindi, B. Alavi, K. Pahlavan, "Measurement and modeling of Ultra Wideband TOA-based ranging in indoor multipath environments," IEEE Transactions on Vehicular Technology, pp. 1046-1058, vol. 58, No. 3, Mar. 2009.
S. Al-Jazzar and J. Caffery, Jr., "New algorithms for NLOS identification," IST Mobile and Wireless Commun. Summit 2005, Dresden, Germany, 2005.
F. Benedetto, G. Giunta, A. Toscano and L. Vegni, "Dynamic LOS/NLOS statistical discrimination of wireless mobile channels," Proc. IEEE 65th Vehicular Technology Conference, pp. 3071-3075., Spring 2007.
N. Alsindi, M. Heidari and K. Pahlavan, "Blockage identification in indoor UWB ranging using multi band OFDM signals," Proc. IEEE Wireless Communications and Networking Conference (WCNC), pp. 3231-3236, Las Vegas, NV, USA, Apr. 2008.
P.-C. Chen, "A non-line-of-sight error mitigation algorithm in location estimation," Proc. IEEE Wireless Communications and Networking Conference (WCNC), vol. 1, pp. 316-320, New Orleans, LA, USA, Sep. 1999.
S. Venkatesh and R.M. Buehrer, "A linear programming approach to NLOS error mitigation in sensor networks,", Proc. IEEE Inf. Process . Sensor Network, 2006.

G. Destino, D. Macagnano and G. T.F. de Abreu, "Hypothesis testing and iterative WLS minimization for WSN localization under LOS/NLOS conditions," Proc. IEEE Asilomar Conference on Signals, Systems and Computers, Nov. 4-7 2007, pp. 2150-2155.
W.-K. Chao and K.-T. Lay, "NLOS measurement identification for mobile positioning in wireless cellular systems," Proc. IEEE 66th Vehicular Technology Conference (VTC), pp. 1965-1969, Sep. 2007.
G. Audrey and G. Julie, "An unscented Kalman filter based maximum likelihood ratio for NLOS bias detection in UMTS localization," 16th Eur. Signal Processing Conf. (EUSIPCO), 2008.
J.M. Huerta, A. Giremus, J. Vidal and J.Y. Tourneret," Joint particl filter and UKF position tracking under strong NLOS situation," Proc. IEEE International Statistical Signal Processing, pp. 537-541, Aug. 2007.
M. Najar, J.M. Huerta, J. Vidal, J. A. Castro, "Mobile location with bias tracking in non-line-of-sight", Proc. IEEE International Conf. Acoustic, Speech, Signal Proc., vol. 3, pp. 956-959, 2004.
S.S. Ghassemzadeh, R. Jana, C.W. Rice, W. Turin and V. Tarokh, "Measurement and modeling of an ultra-wide bandwidth indoor channel," IEEE Transactions on Communications, vol. 52, No. 10, pp. 1786-1796, Oct. 2004.
K. Pahlavan, P. Krishnamurthy and A. Beneat, "Wideband radio propagation modeling for indoor geolocation applications," IEEE Communications Magazine, vol. 36, No. 4, pp. 60-65, Apr. 1998.
H. Hashemi, "The indoor radio propagation channel," Proc. of the IEEE, vol. 81, No. 7, pp. 943-968, Jul. 1993.
T.S. Rappaport, Wireless Communications: Principles and Practice, Prentice-Hall, 1996.
N. Alsindi, "Indoor cooperative localization for ultra wideband wireless sensor networks," PhD Dissertation, Worcester Polytechnic Institute, Worcester, MA, Apr. 2008.
A. Maali, H. Mimoun, G. Baudoin, A. Ouldali, "A new low complexity NLOS identification approach based on UWB energy detection," Proc. IEEE Radio and Wireless Symposium, pp. 675-678, San Diego, CA, USA, Jan. 2009.
I. Guvenc, C.-C. Chong, F. Watanabe, "NLOS identification and mitigation for UWB localization systems," Proc. IEEE Wireless Communications and Networking Conference (WCNC), pp. 1571-1576, Mar. 2007.
S. Venkatesh and R.M. Buehrer, "Non-line-of-sight identification in ultra-wideband systems based on received signal statistics," IET Microwaves, Antennas and Propagation, vol. 1, No. 6, pp. 1120-1130, Dec. 2007.
Heidari, N. Alsindi and K. Pahlavan, "UDP Identification and error mitigation in TOA-based indoor localization systems using neural network architecture," IEEE Transactions on Wireless Communications, vol. 8, No. 7, pp. 3597-3607, Jul. 2009.
J.-Y. Lee, Y.-H. Jo, S.-H. Kang, A.-Y. Kang, D.-H. Ha and S.-.J. Yoon, "Determination of the existence of LOS blockage and its application to UWB localization," Proc. IEEE Military Communications Conference (MILCOM), pp. 1-4, Washington DC, USA, Oct. 2006.
S. Marano, W. M. Gifford, H. Wymeersch and M. Z. Win, "NLOS identification and mitigation for localization based on UWB experimental data," IEEE Journal on Selected Areas in Communications, vol. 28, No. 7, pp. 1026-1035, Sep. 2010.
L. Mucchi and P. Marcocci, "A new parameter for channel identification in UWB indoor environments," Proc. 16th International Conference on Computer Communications and Networks, pp. 419-423, Honolulu, HI, USA, Aug. 2007.
C. E. Shannon, "A mathematical theory of communication," Bell Syst. Tech. J., vol. 27, pp. 379-423; 623-656, Jul./Oct. 1948 [Online] Available http://cm.bell-labs.com/cm/ms/what/shannonday/paper.html.
B. Alavi, K. Pahlavan, "Modeling of the distance error for indoor geolocation," in Proceedings of IEEE Wireless Communications and Networking (WCNC), pp. 668-672, vol. 1, New Orleans, LA, USA, Mar. 2003.
R. Moddemeijer, "On estimation of entropy and mutual information of continuous distributions," Signal Processing, vol. 16, No. 3, pp. 233-246, 1989.
P. Hall and S. Morton, "On the estimation of entropy," Ann. Inst. Stat. Math., vol. 45, pp. 69-88, 1993.

(56) References Cited

OTHER PUBLICATIONS

O. Vasicek, "A test of normality based on sample entropy," J. R. Stat. Soc. Ser. B, vol. 38, pp. 54-59, 1976.

J. C. Correa, "A new estimator of entropy," Commun. Stat.-Theory Methodol., vol. 24, pp. 2439-2449, 1995.

P. Viola, N. N. Schraudolph and T. J. Sejnowski, "Empirical entropy manipulation for real-world problems," in Advances in Neural Information Processing Systems 8. Cambridge, MA: MIT Press, 1996.

D. T. Pham, "Blind separation of instantaneous mixture of sources via an independent component analysis," IEEE Trans. Signal Processing, vol. 44, pp. 2768-2779, Nov. 1996.

J.F. Bercher, C. Vigant, "Estimating the entropy of a signal with applications", IEEE Trans. on Signal Processing, vol. 48, No. 6, pp. 1687-1694, Jun. 2000.

S. Kay, "Model-based probability density function estimation," IEEE Signal Processing Letters, vol. 5, No. 12, Dec. 1998.

M. H. Hayes, Statistical Digital Signal Processing and Modeling, John Wiley & Sons, Inc., 1996.

G. Kitagawa and W. Gersh, "A smoothness priors long AR model method for spectral estimation," IEEE Trans. Automat. Contrl., vol. AC-30, pp. 57-65, 1985.

J.-F. Giovannelli, G. Demoment and A. Herment, "A Bayesian method for long AR spectra estimation: A Comparative study," IEEE Trans. Ultrason. Freq. Ferroelect., vol. 43, pp. 220-233, Mar. 1996.

S.M. Kay, Fundamentals of Signal Processing vol. II: Detection Theory, Prentice Hall, Feb. 6, 1998.

H. L. Van Trees, Detection, Estimation, and Modulation, Part I: Detection, Estimation, and Linear Modulation Theory, John Wiley & Sons, Inc., 2001.

F. Gini, A. Farina and M. S. Greco, "Radar detection and preclassification based on multiple hypothesis testing," IEEE Transactions on Aerospace and Electronic Systems, vol. 40, No. 3, pp. 1046-1059.

H. Lin, A. Hayar and P. Siohan, "An Information Theoretic Analysis on Indoor PLC Channel Characterizations", IEEE International Symposium on Power Line Communications and its Applications, 2009, ISPLC 2009. IEEE 2009, pp. 1-6.

N. Alsindi et al. "NLOS Channel Identification and Mitigation in Ultra Wideband ToA-based Wireless Sensor Networks", 6th Workshop on Positioning, Navigation and Communication 2009. WPNC 2009. IEEE 2009, pp. 59-66.

G. Sun et al. "A minimum entropy estimation based mobile positioning algorithm", IEEE Transactions on Wireless Communications vol. 8, No. 1, Jan. 2009, pp. 24-27.

D Dardari et al. "Ranging with ultrawide bandwidth signals in multipath environments", Proceedings of the IEEE, vol. 97, No. 2, Feb. 1, 2009, pp. 404-426.

N Thomas et al. "Analysis of the dominant propagation mechanisms for radio coverage and interference prediction in urban scenarios at 2.4, 5.8 & 28.0 GHz", First European Conference on Antennas and Propagation, 2006. EUCAP 2006. IEEE 2006.

* cited by examiner (a)                  (b)

METHODS AND DEVICES FOR CHANNEL IDENTIFICATION

FIELD OF THE INVENTION

The present invention relates to methods and devices for channel identification. It is particularly, but not exclusively, concerned with methods and devices for non-line of sight channel identification.

BACKGROUND OF THE INVENTION

Geolocation has gained considerable attention over the last decade due to the enormous potential in the technology and the significant challenges facing this area of research. Geolocation technology provides the fundamental basis for a myriad of location-enabled services in different applications such as locating personnel and objects in residential homes, guiding shoppers inside a mall, locating the elderly in nursing homes or locating firefighters inside burning buildings.

Extending the success of multilateration techniques used by outdoor GPS systems to urban and indoor environments faces fundamental challenges due to their unique propagation environments. Specifically systems that rely on time of arrival (TOA), time difference of arrival (TDOA) and angle of arrival (AOA) work on the assumption that a line of sight (LOS) channel is always available between the reference point and the mobile device. In urban and indoor environments the availability of LOS signals is not always guaranteed due to physical obstructions such as buildings, walls, elevator shafts, etc.

Specifically, NLOS introduces a positive bias to the distance estimation which causes significant localization errors. As a result geolocation in light of the NLOS problem faces considerable challenges that affect the reliability and accuracy of the positioning systems. It is therefore vital to be able to identify NLOS channels in real-time and mitigate their impact on location estimation in order to enable effective and robust geolocation systems.

The integration and utilization of location information in day-to-day applications will grow significantly over the next decade as the technology's accuracy evolves. Currently outdoor localization, thanks to the GPS technology, has revolutionized navigation-based applications running on automotive GPS enabled devices and smart phones. Applications range from guiding drivers to their destination and providing a point-by-point direction to the closest cinema or coffee shop.

The success of GPS (an outdoor only time-of-arrival (TOA) based localization technology) has been due to the reliability, availability of line-of-sight (LOS) and practical accuracy that the orbiting satellites covering the globe provide. Recently as the number of smart devices and mobile users increased significantly, the potential for new location-based services and challenges emerged.

The lucrative business opportunities of location-enabled services are not limited to outdoors. In fact the potential of indoor location-enabled services has been projected by different sources as an untapped multi-billion dollar industry [1]. The range of indoor applications touches every aspect of our lives: from tracking children in day-care centers, tracking elderly in nursing homes, to tracking inventories in warehouses, tracking medical devices in hospitals and tracking personnel in emergency/first responder applications (e.g. firefighters inside a building).

The major challenge facing this new emerging industry is fundamental to the environment where the devices are to be deployed. As the nature of the applications moved closer to the urban cities (high-rise buildings) and into indoor buildings and residences, the problem of GPS coverage has surfaced.

For non-survey based localization technologies (such as GPS), the position is typically achieved through ranging (distance estimation or angle estimation) to different reference points (RPs) with known coordinates. Position estimation then involves solving a set of non-linear equations or through geometric relations.

Geolocation technologies that depend on techniques such time of arrival (TOA), time difference of arrival (TDOA) and angle of arrival (AOA) require a clear LOS between the RPs (the orbiting satellites in the GPS) and the mobile device.

Even in Received Signal Strength (RSS) based systems the LOS/NLOS channel information can be valuable as the technique relies on a priori pathloss models that are unique in those conditions. As a result, as the applications move close to dense urban areas and indoor environments, the major challenge facing accurate localization is the non-line of sight (NLOS) propagation problem [2]. NLOS propagation causes significant errors/biases to distance/angle estimation between mobile devices which affects the localization accuracy directly.

A robust approach to this problem is to identify the condition of the channels and then integrate this information in a NLOS mitigation algorithm. FIG. 1 provides an overview of where the NLOS identification technique can be integrated. For typical wireless geolocation systems a mobile device relies on N RPs to estimate its own position using measured metrics such as TOA, TDOA, AOA and RSS to infer geometric relation. In the figure two of the N measured signals experience NLOS conditions. In traditional approaches all the measurements are assumed to be under the LOS and large positioning errors will occur due to the NLOS corrupted measurements. In NLOS identification enabled systems, it is possible to identify the "bad links" and incorporate that information in a NLOS mitigation algorithm to estimate the position more accurately.

As shown in FIG. 1(a), in wireless geolocation systems, some range measurements (links) experience NLOS propagation where the LOS path is obstructed by objects, walls, etc. In this example the links for signals $s_1$ and $s_3$ experience NLOS propagation. As shown in FIG. 1(b), in traditional GPS-like systems, all the measurements are treated equally in the position estimation 100 and the system is "channel-blind". This results in large estimation errors when some of the links experience NLOS conditions and therefore create incompatible or skewed estimates of the position.

FIG. 1(c) shows an overview of a location system in which NLOS Identification/Mitigation is provided. In such a system, the range measurements are first passed through a NLOS Identification Algorithm 110. Once the "bad links" are identified then that information is incorporated in a NLOS Mitigation Algorithm 120 prior to Position Estimation 130 which can improve accuracy substantially. In the example of FIG. 1(a), the NLOS Identification Algorithm would identify signals $S_1$ and $s_3$ as NLOS signals and the impact of these signals on the position estimate would then be mitigated by the NLOS Mitigation Algorithm 120 before the position estimate is created based on the remaining signals.

NLOS identification involves inferring the state of the channel by examining some properties of the received signal. For example a received signal under NLOS might exhibit significantly higher power variations in time compared to signals in LOS condition and as a result it is possible to infer the state of the channel. This approach however is not robust since it does not exploit all the available information. In addition there are cases where the time variation of LOS and NLOS are similar and the identification becomes difficult.

A more robust approach is to infer the state of the channel by estimating and analyzing the Channel Impulse Response (CIR) which is a characterization of the multipath profile of the channel between a mobile device and a RP. The CIR essentially contains the "history" of how the multipath signals reflected, diffracted and combined at the receiver and as a result this information has a stronger correlation with the channel condition be it LOS or NLOS. The existing NLOS identification techniques in literature are generally divided into two main approaches: CIR based and non-CIR based identification techniques.

In non-CIR based techniques the identification is achieved without estimating the CIR. Instead, identification is achieved by either examining some characteristic of the received signal or by assessing the impact of NLOS on the position estimation (that usually combine identification and mitigation in one step).

The most popular non-CIR based technique is the binary hypothesis test based on the statistical information/behavior of the range measurements TOA, RSS, and AOA, or a combination of them in hybrid approaches. In [3] the NLOS identification is achieved by analyzing the statistics of the time measurements and devising a binary hypothesis test to infer the state of the channel. Then the identification results are further verified through the adoption of a residual analysis rank test. Here, the residual is defined as the difference between the measured range and the calculated range.

In [4], NLOS identification is achieved through constructing a binary generalized likelihood ratio test (GLRT) using the TOA/TDOA (timing) range measurements to distinguish between LOS and NLOS conditions. The technique assumes that both LOS and NLOS range measurements follow a Gaussian distribution; while this might be valid for LOS, the assumption is not valid for most NLOS conditions.

Building on this idea, the work in [5] proposes three different statistical techniques to identify NLOS conditions depending on the a priori NLOS statistical information. If NLOS errors are treated as outliers (low probability of occurrence—i.e. few of the observations are NLOS) it then they can be identified through skewness and kurtosis tests. For the cases where more frequent NLOS errors occur but with a statistical PDF that is non-Gaussian and completely unknown, then [5] proposes different statistical tests (such as the modified Shapiro-Wilk W and the Anderson-Darling $A^2$) to infer if the sample came from a normal distribution or not. In the cases that statistical distribution of NLOS range measurement are known but the parameters of the distribution are unknown, then a GLRT to identify NLOS measurements is proposed.

In [6] NLOS identification is achieved through a hybrid TOA/RSS hypothesis test where the statistics of TOA range measurements are combined with pathloss models that characterize the RSS in LOS and NLOS. One weakness of this technique is the reliance on a priori pathloss models which vary in different areas and also lacks accuracy in their relation to distance. The work is further extended in [7] where NLOS identification based on AOA statistics is proposed.

A hybrid TOA/RSS technique for acoustic localization is also proposed in [8] where by comparing distance estimates obtained from TOA and RSS (attenuation model) measurements a decision on the condition of the channel is obtained. A similar technique was proposed in a U.S. patent application where the TOA estimates are combined with RSS (pathloss model) information in a Bayesian framework [9]. Specifically, the likelihood of the channel being NLOS is computed through the Bayes' equation but relying on a priori pathloss models and statistical relationship of the channel condition and distance. This identification method's weakness is its dependence on a priori pathloss models which can vary in different environments.

A non-parametric binary hypothesis NLOS identification technique is proposed in [10] which assume that the statistics of the NLOS errors are usually unknown. As a result the technique first approximates the distribution of the range measurements then a Kullback-Leibler distance metric is used to determine the distance between the distribution of the measurement and the distribution of a prior known measurement distribution such as Gaussian in LOS condition. One major weakness of these techniques is that they rely on the statistics of range error which in many occasions might not provide sufficient information to clearly distinguish between LOS and NLOS. Measurement and modeling of range measurements have revealed that the distribution in LOS and NLOS at a given fixed location can be modeled as Gaussian. The NLOS biases in a fixed location are constant (unknown-deterministic), as a result in some cases when the environment is quasi-stationary the two distributions might not have sufficient separation between them [11].

Another non-CIR based NLOS identification technique is based on inferring the channel condition by examining the statistics of the envelope of the received signal. The basic idea behind this approach is that the envelope of the received signal has different statistical behavior in LOS versus NLOS. Two envelope-based NLOS identification techniques are proposed in [12] that are based on examining the envelope of the received signal for cellular systems. The first is based on the idea that the fading statistics of the signal envelope in LOS follows a Rician distribution while in NLOS it follows a Rayleigh distribution and thus a hypothesis test can be devised. The second technique achieves NLOS identification through analyzing the level crossing rate and the average fade duration which are different in Rician (LOS) and Rayleigh (NLOS) channels. A similar approach has been proposed in [13] where the LOS/NLOS identification is achieved through hypothesis test on the Rician K factor.

In [14] frequency diversity was exploited in a non-CIR based NLOS identification technique which examined the behavior of TOA estimation on different UWB-OFDM sub-bands. Since the signal propagation is affected by the center frequency (higher frequencies causes more attenuation), then as the frequency increases the TOA estimation will vary significantly in NLOS conditions. Thus by examining the TOA estimation across different sub-bands it is possible to infer the state of the channel. By analyzing the variance of TOA estimation across different sub-bands, [14] verified through experimental measurements that NLOS channels can be identified by exploiting frequency diversity.

Another alternative non-CIR NLOS identification technique is grouped under identification through evaluation of the quality of position estimation where the NLOS channel problem is dealt with indirectly as compared to the techniques so far. Specifically the location is typically estimated and the residual of position estimates is computed to infer the existence of NLOS links. The author in [15] recognized that it can be difficult to rely on the statistics of range measurements to identify NLOS channels and as a result proposed a technique called the Residual Weighting Algorithm (Rwgh) that combines the identification and mitigation and alleviates the effect of NLOS. The technique is based on the concept that the residual of the position estimation is typically higher when there are NLOS range measurements involved in the localization process. The NLOS links are "identified" through a repeated procedure of calculating and analyzing the residual for different groups of links. The links resulting in highest residual imply that they are in NLOS. The technique's major weakness is the requirement for repeated computation of the position and residual through a combinatorial process.

In [16] a linear programming approach to the NLOS problem has been proposed for sensor networks where the identification is implicitly achieved. In [17] an alternative non-parametric approach to distance based localization is proposed where a triangular inequality property of the Euclidean space is exploited and a hypothesis test is employed to classify links as LOS or NLOS. In [18] a modified residual test is used to identify and mitigate NLOS problems in cellular systems. In many localization applications mobile devices will be moving and this dynamic information can be exploited to identify NLOS conditions. Specifically in [19] a sequential Fault Detection and Isolation (FDI) technique is proposed to jointly identify NLOS and track the mobile user. In addition an unscented Kalman filtering approach is further investigated to address the joint NLOS and tracking problems. Similar work has been proposed in [20] [21].

The non-CIR based techniques that have been introduced thus far have focused on examining the received signal which is a limited attribute of the multipath channel. Another more robust approach is to analyze the multipath information through estimating the CIR. The CIR is a representation of the multipath signal arrivals at the receiver. It has been verified through numerous measurement experiments [22], [23], [24], [25] that the CIR of LOS channels exhibit statistical properties that are distinct from NLOS channels. All the CIR-based NLOS identification techniques in literature follow a binary hypothesis test, but the difference lies in the adopted test metric. The major proposed test metrics in literature are ratio of multipath components (power and time), mean excess delay, multipath delay spread and very recently kurtosis.

In LOS channels it is well known that the first (direct arrival) signal is typically the strongest. However for NLOS channels the first arrival path is not always the strongest (due to attenuation of the signal traveling through obstacles) and as a result a simple CIR-based NLOS identification approach is to evaluate the ratio of the first path and the strongest path. Intuitively if the first path is the strongest path, then the ratio is 1 highlighting a LOS while a very low ratio indicates a NLOS condition. This technique was proposed by [26] and [27]. This approach has limited identification capabilities since it does not exploit all the information available in the CIR.

An alternative approach is to analyze higher order statistics of the CIR to infer the condition of the channel. Since the CIR is a realization of a random process then characterizing the statistics of this random variable can provide a better insight into the condition of the channel. Specifically, CIRs of LOS channels should exhibit different statistical properties compared to CIRs of NLOS channels.

One basic statistical metric that has been used is the mean excess delay which is the first moment of the CIR. Small excess delay value indicates a LOS channel and larger excess delay imply NLOS. An excess delay hypothesis test to identify NLOS channels was proposed in [28], [29] and [33]. An improved NLOS identification can be achieved using the RMS delay spread which is a second moment statistics of the CIR. In [28], [29], [30], [31], [32] and [33] the RMS delay spread metric was used in NLOS identification with varying degrees of success. One major weakness of the RMS delay spread as a NLOS identification metric is that the conditional distributions of the RMS delay spread in LOS and NLOS are "close" to each other—weak correlation to the condition. This means that a hypothesis test will result in significant misdetections (LOS identified as NLOS—higher probability in making an error in the identification process) and as a result the metric is not a robust indicator of the channel condition.

Recognizing this, [28], [29] proposed a NLOS identification technique based on the kurtosis of the measured CIR which is defined as the ratio of the fourth order moment of the data to the square of the second order moment or the variance. Alternatively it can be a measure of how peaked or flat the data is relative to a normal distribution. Measurement data typically show that LOS channels are more "peaked" compared to "flatter" NLOS channels and thus higher kurtosis values can indicate a LOS channel. However the results in [28] clearly show that there are cases where kurtosis cannot provide satisfactory identification and as a result it is further proposed to use joint metrics (combining mean excess delay, RMS delay spread and kurtosis) for the NLOS identification. By combining the different metrics in a joint statistic the approach in [28] increases the information available to the identification process and thus improves the performance. This indicates that metrics which contain "more" information exhibit better NLOS identification capabilities. Since the introduction of the kurtosis based NLOS identification by [28] several other researchers evaluated the effectiveness of the kurtosis metric [33], [34], and [35].

What is evident from the above references is that the robustness of NLOS identification relies on the robustness of the metric used. The non-CIR based approaches provide "coarse" identification compared to the CIR-based techniques since they rely on the statistics of range measurement and not the channel information. Within the CIR-based techniques it is also evident that the robustness of the metric improves with the order of the statistics of the CIR. In addition to being verified experimentally, this relationship holds true since higher order statistics of a random variable characterize the random variable more accurately.

The NLOS Problem

In a multipath environment, the transmitted signal undergoes reflections, attenuations and diffractions prior to arriving at the receiver. At the receiver, replicas of the transmitted signal arrive attenuated, phase shifted and time-delayed. The multipath signal is a combination of those multiple signal arrivals. Formally the received signal can be described as $$r(t) = \sum_{k=1}^{L_p} \alpha_k e^{j\phi_k} s(t - \tau_k) \tag{1}$$

where s(t) is the transmitted signal waveform, r(t) is the received waveform, where $L_p$ is the number of MPCs, and $\alpha_k$, $\phi_k$ and $\tau_k$ are amplitude, phase and propagation delay of the signal traveling the kth path, respectively. A more practical approach to analyzing the impact of multipath on localization is to analyze the CIR which is usually modeled as, $$h(\tau) = \sum_{k=1}^{L_p} \alpha_k e^{j\phi_k} \delta(t - \tau_k) \tag{2}$$

where $\delta(\square)$ is the Dirac delta function [2].

FIG. 2 illustrates multipath propagation in three different characteristic environments: (a) Outdoor open space—single bounce model; (b) Urban propagation; and (c) Indoor propagation.

In LOS conditions, the direct path signal is the strongest and it is possible to estimate the distance fairly accurately. Multipath signals (especially in dense cluttered environment)

tend to arrive fairly close to the direct path. If the inter-arrival time between the multipath components is much smaller than the time-domain resolution of the system (low bandwidth systems) then at the receiver the multiple signals will combine to create a new cluster. The TOA estimate (from the receiver's point of view) will then be the peak of the cluster.

In order to clarify this phenomenon FIG. 3 illustrates a CIR example and the resulting envelope. In the example of FIG. 3 there are 10 multipath components indicated by the vertical arrows. The first multipath component is the strongest and in this case it is the LOS or direct path. The multipath components arrive after the direct path arrive in close proximity to each other (because of the nature of the propagation environment). For this system, the multipath components arrive and combine (due to low time-domain resolution) and appear at the receiver as 4 multipath components (the overall envelope shown by the solid line). As a result the peaks of this curve will ultimately be detected as path arrivals. The first path arrival will be estimated as the LOS path and thus used for distance estimation. However, it is clear in this case that the actual TOA as shown by the first arriving signal is not equal to the estimated TOA as derived from the peak of the envelope. This difference in estimation is due to the multipath error.

For higher system bandwidths, the multipath error in LOS environments is usually smaller. For example, FIG. 4 illustrates a measured CIR for 200 MHz bandwidth in a typical LOS office environment. From FIG. 4 it can be seen that the Estimated TOA and the Expected TOA, differ only marginally.

Thus, TOA-based ranging error in LOS environments is attributed to both multipath and measurement noise. Let $\alpha_1^{DP}$ and $\tau_1^{DP}$ denote the direct path (DP) amplitude and propagation delay, respectively. The distance between the transmitter and the receiver is $d^{DP}=v\times\tau_1^{DP}$, where v is the speed of signal propagation. In general, TOA-based ranging accuracy is determined by the ranging error which is defined as the difference between the estimated and the actual distance or, $$\epsilon = \hat{d} - d \tag{3}$$

In a general LOS multipath environment the mobile device will experience varying error behavior depending on the structure of the propagation environment and the system bandwidth. In LOS the distance estimate can be modeled by $$\hat{d}_{DP} = d_{DP} + \epsilon_{DP}(\omega) + \tilde{n} \tag{4}$$

where $\epsilon_{DP} = \tilde{b}_m(\omega)$ is a bias induced by the multipath and it is a function of the system bandwidth and ñ is a zero-mean additive measurement noise. Typically the multipath error is modeled in the spatial domain as a zero mean Gaussian random variable [37]. This means that an ensemble of LOS measurements in a given LOS environment will generally result in a Gaussian distribution.

In NLOS conditions, however, there is an obstruction in the path of the transmitter and receiver. Depending on the type of obstruction and the relative distances of the transmitter/receiver to the obstruction, the channel behavior (CIR) and ranging error can vary significantly.

There are two specific NLOS cases or conditions that occur in typical obstructed environments. These are illustrated schematically in FIG. 5.

The first is when the DP signal is attenuated but detected (albeit with weak SNR). This situation is illustrated in FIG. 5a and can arise naturally when the transmitter and receiver are separated by "light" obstructions such as a glass door, wooden door or sheet-rock thin walls. Indeed in this scenario TOA estimates can be obtained with good accuracy due to the detection of the DP signal.

The second NLOS case occurs when there is a "heavy" obstruction between the transmitter and receiver which attenuates the DP severely making it difficult for the receiver to detect it. This situation is illustrated in FIG. 5b. The first non-direct path (NDP) component is then used for TOA estimation. This results in a significant bias that corrupts the TOA estimation and ultimately the position estimate.

Thus the two NLOS conditions can be explicitly distinguished by the presence or absence of the DP: NLOS-DP and NLOS-NDP, respectively. For the receiver to detect the DP, the ratio of the strongest MPC to that of the DP given by $$\kappa_1 = \frac{\max(|\alpha_i|_{i=1}^{L_p})}{\alpha^{DP}} \tag{5}$$

must be less than the receiver dynamic range κ and the power of the DP must be greater than the receiver sensitivity φ. These constraints are given by, $$\kappa_1 \leq \kappa \tag{6a}$$

$$P_{DP} > \phi \tag{6b}$$

where $P_{DP} = 20 \log_{10}(\alpha_1^{DP})$ It is possible then to categorize the conditions based on the following ranging states [11]. In the presence of the DP (NLOS-DP), both the constraints $\kappa_1 \leq \kappa$ and $P_{DP} > \phi$ are met and the distance estimate is accurate yielding $$\hat{d}_{DP}^{NLOS} = d_{DP} + \epsilon_{DP}^{NLOS} + \tilde{n} \tag{7a}$$

$$\epsilon_{DP}^{NLOS} = b_{pd} + \tilde{b}_m(\omega) \tag{7b}$$

where $\tilde{b}_m$ is the zero-mean random bias induced by the multipath, $b_{pd}$ is the bias corresponding to the propagation delay experienced by the signal going through the obstruction and ñ is a zero-mean additive measurement noise. It has been shown that $\tilde{b}_m$ is indeed a function of the bandwidth and signal to noise ratio (SNR) [23], while $b_{pd}$ dependent on the medium of the obstacle.

In the absence of the DP (NLOS-NDP), the requirement $\kappa_1 \geq \kappa$ is not met and the DP is shadowed by heavier obstacle burying its power under the dynamic range of the receiver. Ranging can be achieved using the amplitude and propagation delay of first NDP component given by $\alpha_1^{NDP}$ and $\tau_1^{NDP}$ respectively; resulting in a longer distance $d^{NDP} = v \times \tau_1^{NDP}$ where $d^{NDP} > d^{DP}$. In this situation, the ranging estimate experiences a larger error compared to the other two conditions (LOS and NLOS-DP). Emphasizing that ranging is achieved through the first arriving NDP component, the estimate is then given by $$\hat{d}_{NDP}^{NLOS} = d_{DP} + \epsilon_{NDP}^{NLOS} + \tilde{n} \tag{8a}$$

$$\epsilon_{NDP}^{NLOS} = b_{pd} + b_B + \tilde{b}_m(\omega) \tag{8b}$$

where $b_B$ is a deterministic but spatially random (due to the unknown nature of the obstacle) additive bias representing the "loss" of the DP. Unlike the multipath biases, and similar to biases induced by propagation delay, the dependence of $b_B$ on the system bandwidth and SNR has its own limitations as reported in [23].

To further illustrate the two NLOS conditions, FIGS. 6 and 7 show results of CIR measurements in a typical office environment for the two situations discussed above. FIG. 6 shows a CIR measurement of a "light" NLOS channel (NLOS-DP); the DP is attenuated but can be detected as shown by the circular highlight. FIG. 7 shows a CIR measurement of a severe NLOS multipath channel (NLOS-NDP); the DP is not detected as shown by the circular highlight.

This sub-classification of NLOS conditions has not received significant attention in NLOS identification literature and almost all techniques propose a binary hypothesis test to distinguish between LOS and NLOS. By adopting this traditional "black" or "white" approach, there is a high probability of misclassifying NLOS conditions which reduces the robustness of NLOS identification and mitigation algorithms. As a result in this invention report we define three channel conditions (hypotheses): LOS, NLOS-DP and NLOS-NDP and later we will illustrate through results of experimental measurements that it is necessary to devise a ternary hypothesis test to identify the condition. The characterization of ranging error in different scenarios is summarized in Table 1.

TABLE 1

Summary of TOA-based Ranging Error Conditions

| | LOS | NLOS-DP | NLOS-NDP |
|---|---|---|---|
| Distance calculation Error | $\hat{d}_{DP} = d_{DP} +$ $\epsilon_{DP}(\omega) + \tilde{n}$ $\epsilon_{DP}(\omega) = \hat{b}_m(\omega)$ | $\hat{d}_{DP}^{NLOS} = d_{DP} +$ $\epsilon_{DP}^{NLOS} + \tilde{n}$ $\epsilon_{DP}^{NLOS} = b_{pd} +$ $\hat{b}_m(\omega)$ | $\hat{d}_{NDP}^{NLOS} = d_{DP} +$ $\epsilon_{NDP}^{NLOS} + \tilde{n}$ $\epsilon_{NDP}^{NLOS} = b_{pd} +$ $b_B + \hat{b}_m(\omega)$ |
| CIR | Illustrated in FIG. 8 | Illustrated in FIG. 6 | Illustrated in FIG. 7 |

In order to enable effective, robust and accurate geolocation systems that operate in different multipath environments, it is thus desirable to incorporate NLOS identification algorithms in the localization estimation process.

Location enabled technology has received considerable attention in the last decade mainly due to the potential of integrating the technology in smart devices. GPS-enabled mobile devices have proven a great success in outdoor (non-obstructed) environments where the technology is used to guide drivers to their destinations or support pedestrians as they walk through the city. As the technology moves closer to dense urban environments and especially indoors, the localization performance degrades significantly. The main challenge facing localization in harsh multipath environments (such as indoors) is the NLOS problem which introduces significant errors to the location estimation.

As a result in order to enable accurate localization in such environments NLOS identification and mitigation algorithms should be integrated in the localization process. The effectiveness of NLOS mitigation will depend on the robustness of the NLOS identification, which means that the techniques have to demonstrate a high probability of detection in order to enable accurate localization performance. Although there are several state of the art NLOS identification techniques, their robustness and effectiveness are limited.

Accordingly, an object of the present invention is to provide one or more NLOS identification algorithms which are robust and effective. A further object of the present invention is to provide a mobile device which can accurately determine its position in an NLOS environment.

SUMMARY OF THE INVENTION

An exemplary aspect of the present invention provides a method of identifying the transmission channel condition of a signal received by a receiver, the method including the steps of: estimating the entropy of the channel impulse response of said signal; and determining, from the estimated entropy, whether said signal includes components that have traversed a direct path and non-direct paths or consists of components that have traversed non-direct paths only.

A further exemplary aspect of the present invention provides a method of locating a mobile device having a receiver, the method including the steps of: receiving a signal from a transmitter in a known location; estimating the entropy of the channel impulse response of said signal; determining, from the estimated entropy, whether said signal includes components that have traversed a direct path and non-direct paths or consists of components that have traversed non-direct paths only; and determining the location of the mobile device using the information about the determined signal paths.

A further exemplary embodiment of the present invention provides a mobile device having a receiver and a control unit, wherein: the receiver is arranged to receive a signal from a transmitter in a known location; and the control unit is arranged to: estimate the entropy of the channel impulse response of said signal; determine, from the estimated entropy, whether said signal includes components that have traversed a direct path and non-direct paths or consists of components that have traversed non-direct paths only; and determine the location of the mobile device using the information about the determined signal paths.

BRIEF DESCRIPTION OF THE DRAWINGS

Embodiments of the invention will now be described by way of example with reference to the accompanying drawings in which.

DETAILED DESCRIPTION

Figure 1:
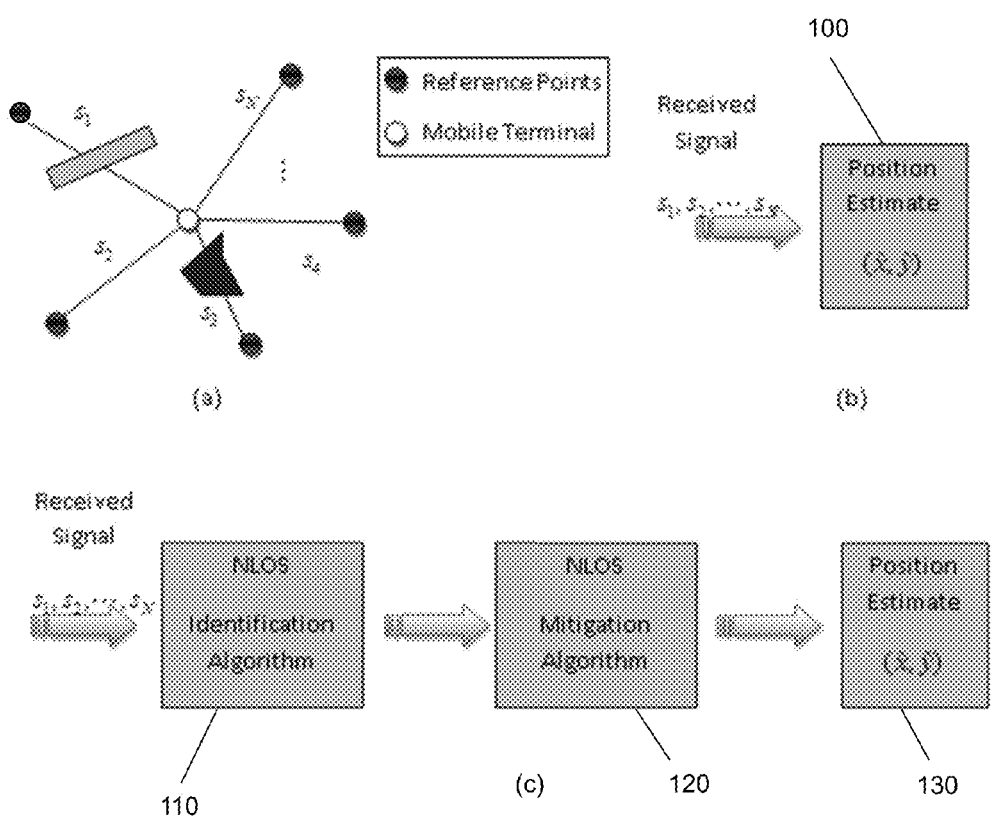
FIG. 1 provides an overview of NLOS identification and its role in the position estimation process and has already been described.
Figure 2:
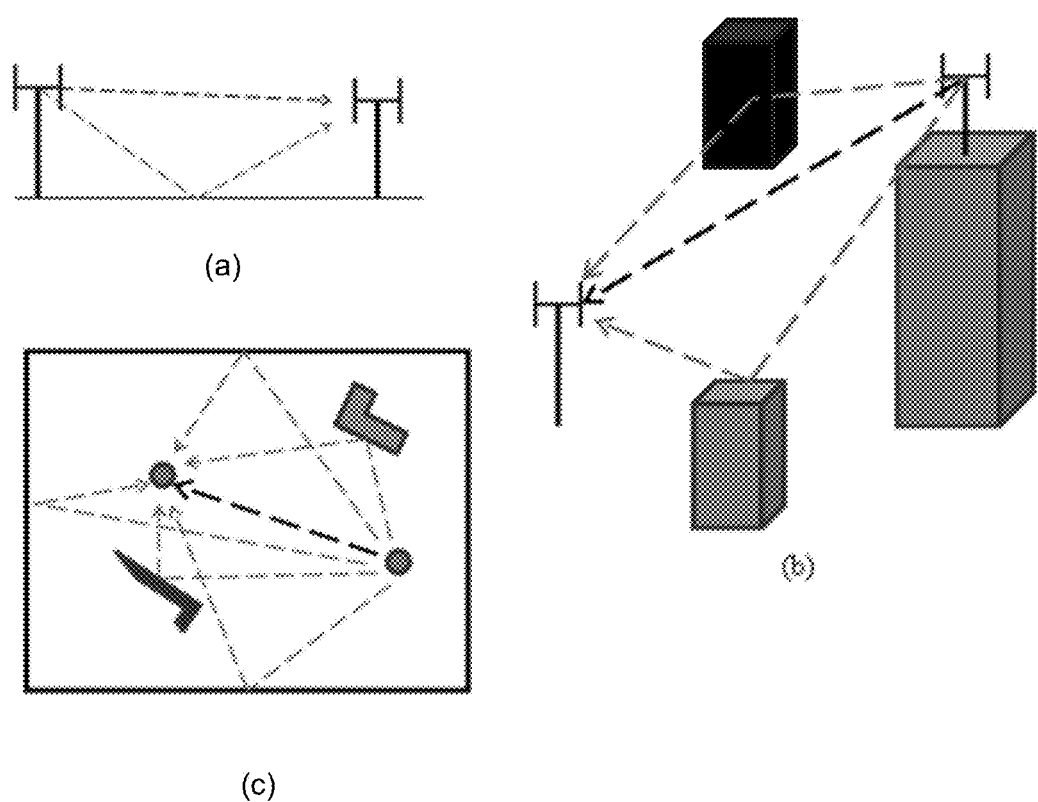
FIG. 2 shows an overview of different wireless propagation examples and has already been described.
Figure 3:
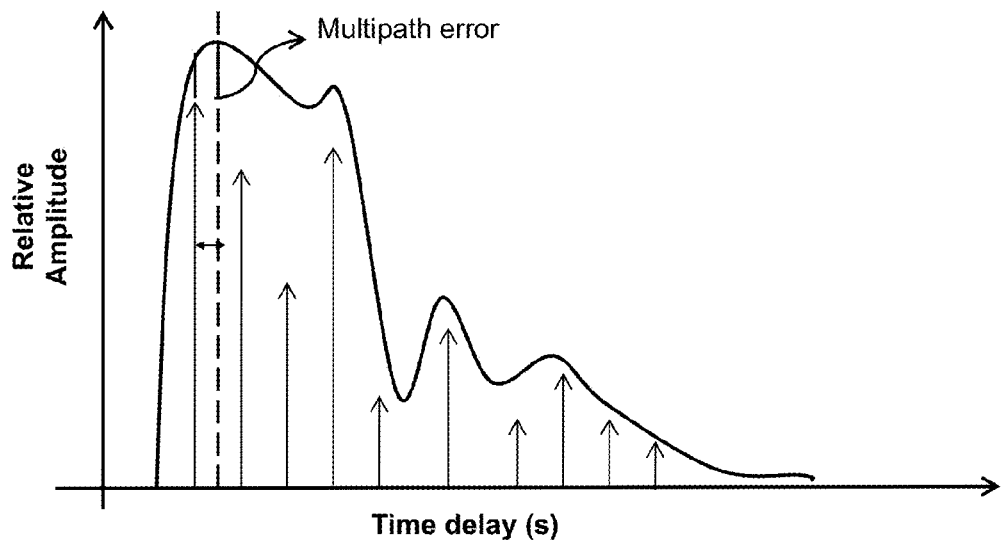
FIG. 3 illustrates an example CIR and the resulting envelope in the presence of a number of multipath components and has already been described.
Figure 4:
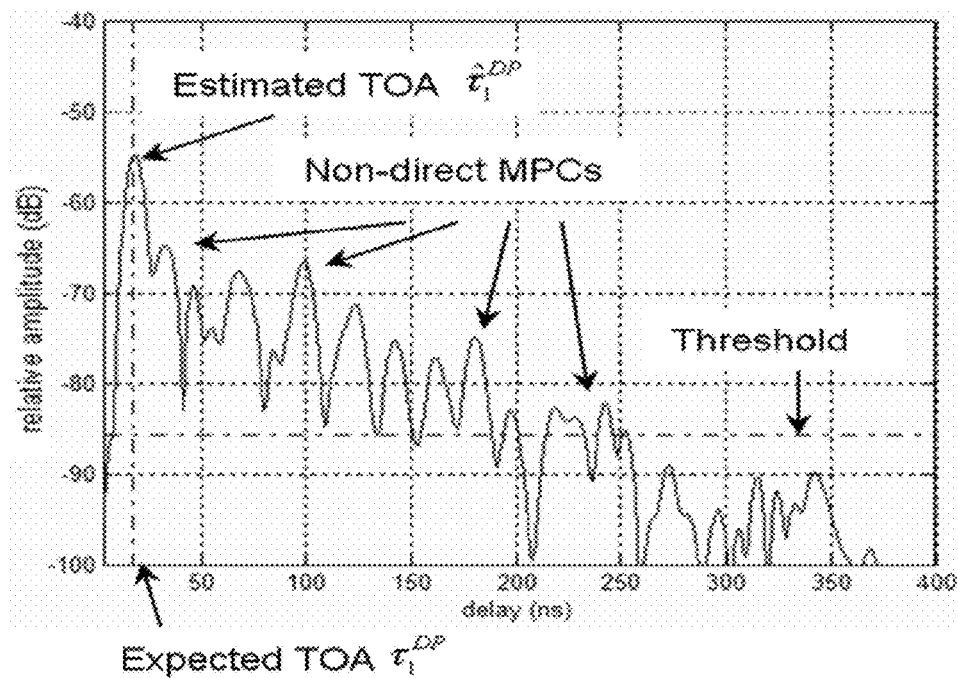
FIG. 4 shows a measured CIR in a typical LOS office environment and has already been described.
Figure 5:
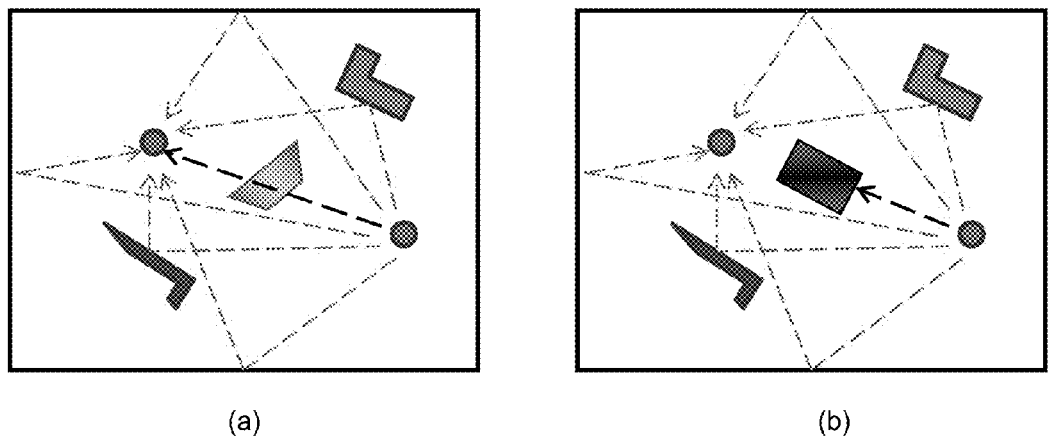
FIG. 5 illustrates two different NLOS cases or conditions that occur in typical obstructed environments and has already been described.
Figure 6:
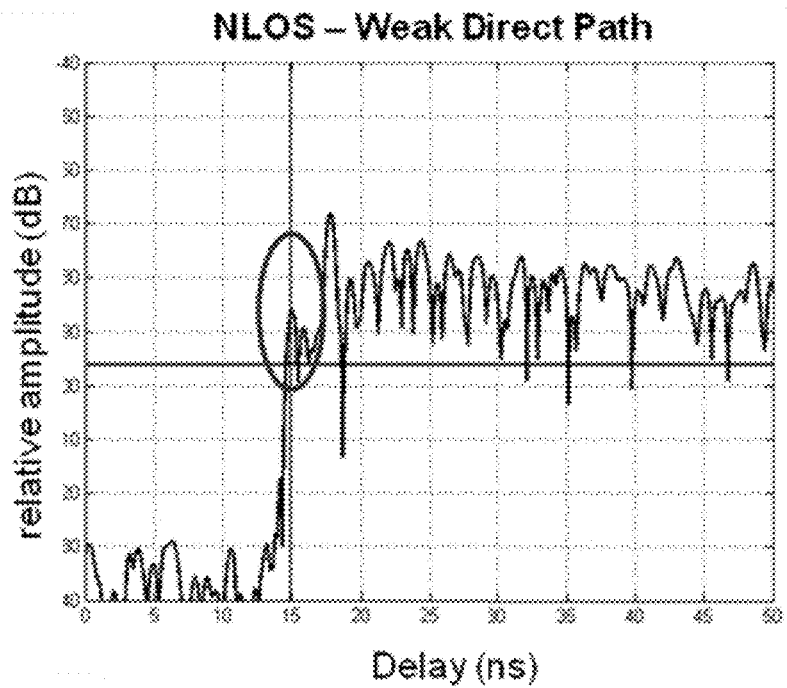
FIG. 6 shows the detection of a weak direct path signal in a CIR of a received signal in an NLOS environment and has already been described.
Figure 7:
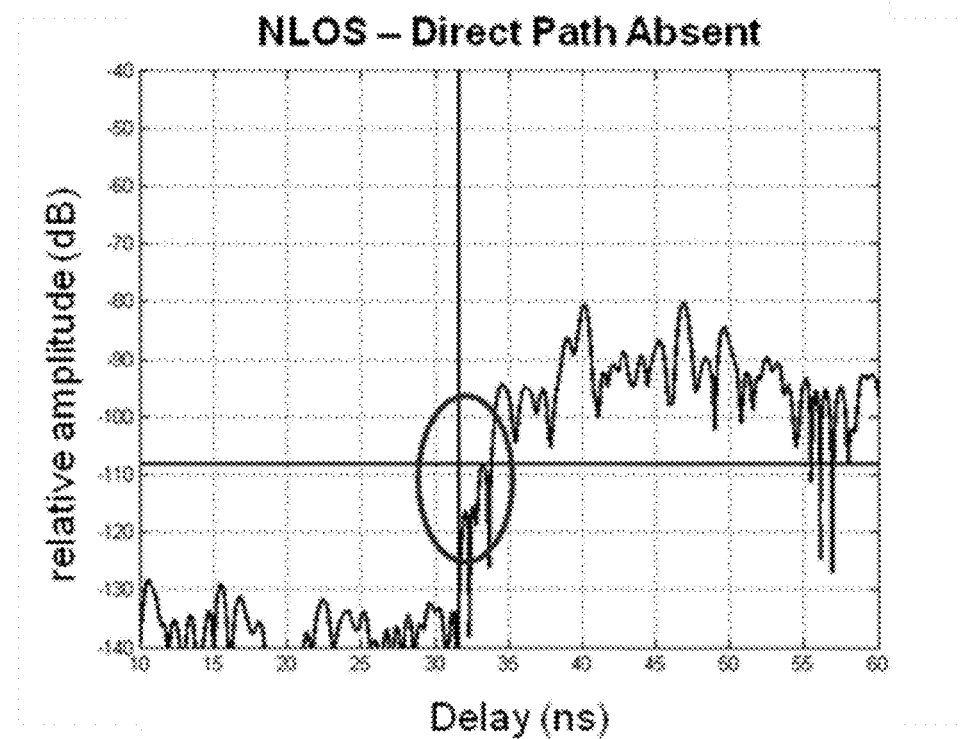
FIG. 7 shows the non-detection of a direct path signal in a CIR of a received signal in an NLOS environment and has already been described.
Figure 8:
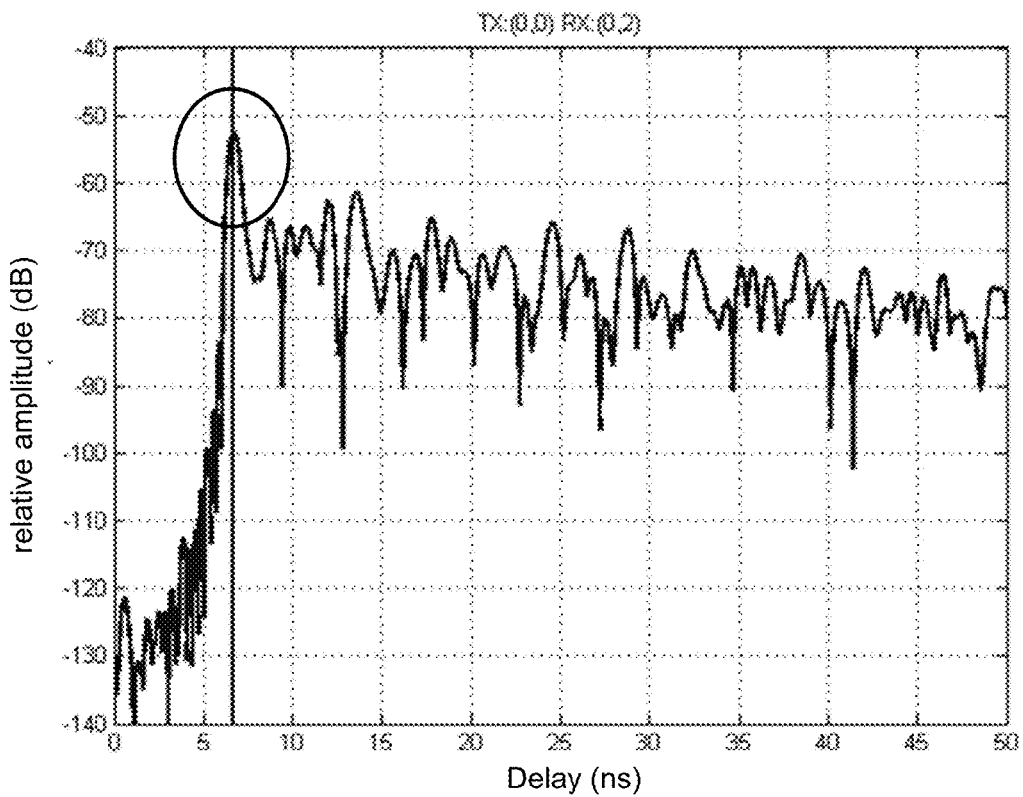
FIG. 8 shows the detection of an unattenuated direct path signal in a CIR of a received signal in LOS condition and has already been described.

Accordingly, at its broadest, a first aspect of the present invention provides a method of identifying the transmission channel of a signal using the entropy of the channel impulse response of that signal.

A first aspect of the present invention preferably provides a method of identifying the transmission channel condition of a signal received by a receiver, the method including the steps of: estimating the entropy of the channel impulse response of said signal; and determining, from the estimated entropy, whether said signal includes components that have traversed a direct path and non-direct paths or consists of components that have traversed non-direct paths only.

The method of this aspect provides an NLOS identification technique that distinguishes channel conditions based on entropy estimation of the channel. Since the Channel Impulse Response (CIR) is a characterization of the multipath channel between a transmitter and a receiver, it is possible to devise an entropy metric in an information theoretic framework that yields a robust NLOS identification system.

Entropy of a signal is a measure of "information" in the signal and its computation typically involves estimating the probability density function (PDF) of the random variable through the very well known Shannon equation [36]. Since the CIR is a random process (in time and space), estimating its PDF provides full statistical characterization. As a result, from a statistical and information point of view, entropy is more robust than the lower order statistics such as the excess mean delay, RMS delay and kurtosis since they do not fully characterize the statistical behavior of the random variable.

The CIR is highly correlated with the channel condition, as is demonstrated experimentally below. Thus by examining the entropy of the CIR it is possible to distinguish between LOS and NLOS channels.

Results of experimental measurements of the CIR in different environments set out below verify the robustness of embodiments of this aspect. In particular the entropy of the CIR has a particular ability to detect the existence of a direct path element and thus is highly relevant to geolocation in NLOS environments.

The method of this aspect thereby harnesses the full statistical information in a CIR to construct a robust entropy-based channel identification algorithm. Below it is shown that embodiments of this algorithm are superior to existing techniques in particular RMS delay spread and kurtosis.

The method may further include the step of, if the signal is received through a non-line of sight channel, determining from the estimated entropy, whether the signal includes a direct path element which is attenuated or if the signal does not include a direct path element.

Thus the method can distinguish the three possible channel conditions of: LOS/direct path; NLOS with a detectable direct path element; and NLOS without any detectable direct path element.

Embodiments of the present aspect provide for different approaches to the determination of the transmission channel according to the available information.

In one embodiment, the step of determining whether said signal includes components that have traversed a direct path and non-direct paths or consists of components that have traversed non-direct paths only includes the step of, comparing said estimated entropy to a known probability distribution function of entropy for each possible channel condition.

In a development of this embodiment, the step of comparing takes account of the known likelihoods of the transmission by each of the possible channel conditions.

In another embodiment the step of determining includes the steps of: starting from a null hypothesis that the signal consists only of components that have traversed non-direct paths and applying a Neyman-Pearson (NP) hypothesis test to the estimated entropy to determine whether a direct path component is present or not; and, if a direct path component is present, applying a binary Bayesian test to the estimated entropy to determine whether the direct path component is attenuated or not.

The above embodiments provide CIR-based NLOS identification techniques that estimate the entropy of CIR and identify the NLOS condition through hypothesis testing.

At its broadest, a second aspect of the present invention provides a method of locating a mobile device using the entropy of the channel impulse response of a signal received by that device.

Accordingly a second aspect of the present invention preferably provides a method of locating a mobile device having a receiver, the method including the steps of: receiving a signal from a transmitter in a known location; estimating the entropy of the channel impulse response of said signal; determining, from the estimated entropy, whether said signal includes components that have traversed a direct path and non-direct paths or consists of components that have traversed non-direct paths only; and determining the location of the mobile device using the information about the determined signal paths.

The method of this aspect provides an NLOS identification technique that distinguishes channel conditions based on entropy estimation of the channel. Since the Channel Impulse Response (CIR) is a characterization of the multipath channel between a transmitter and a receiver, it is possible to devise an entropy metric in an information theoretic framework that yields a robust NLOS identification system.

Entropy of a signal is a measure of "information" in the signal and its computation typically involves estimating the probability density function (PDF) of the random variable through the very well known Shannon equation [36]. Since the CIR is a random process (in time and space), estimating its PDF provides full statistical characterization. As a result, from a statistical and information point of view, entropy is more robust than the lower order statistics such as the excess mean delay, RMS delay and kurtosis since they do not fully characterize the statistical behavior of the random variable.

The CIR is highly correlated with the channel condition, as is demonstrated experimentally below. Thus by examining the entropy of the CIR it is possible to distinguish between LOS and NLOS channels.

Results of experimental measurements of the CIR in different environments set out below verify the robustness of embodiments of this aspect. In particular the entropy of the CIR has a particular ability to detect the existence of a direct path element and thus is highly relevant to geolocation in NLOS environments.

The method of this aspect thereby harnesses the full statistical information in a CIR to construct a robust entropy-based channel identification algorithm. Below it is shown that embodiments of this algorithm are superior to existing techniques in particular RMS delay spread and kurtosis.

The method may further include the step of, if the signal is received through a non-line of sight channel, determining from the estimated entropy, whether the signal includes a direct path element which is attenuated or if the signal does not include a direct path element.

Thus the method can distinguish the three possible channel conditions of: LOS/direct path; NLOS with a detectable direct path element; and NLOS without any detectable direct path element.

Embodiments of the present aspect provide for different approaches to the determination of the transmission channel according to the available information.

In one embodiment, the step of determining whether said signal includes components that have traversed a direct path and non-direct paths or consists of components that have traversed non-direct paths only includes the step of, comparing said estimated entropy to a known probability distribution function of entropy for each possible channel condition.

In a development of this embodiment, the step of comparing takes account of the known likelihoods of the transmission by each of the possible channel conditions.

In another embodiment the step of determining includes the steps of: starting from a null hypothesis that the signal consists only of components that have traversed non-direct paths and applying a Neyman-Pearson (NP) hypothesis test to the estimated entropy to determine whether a direct path component is present or not; and, if a direct path component is present, applying a binary Bayesian test to the estimated entropy to determine whether the direct path component is attenuated or not.

The above embodiments provide CIR-based NLOS identification techniques that estimate the entropy of CIR and identify the NLOS condition through hypothesis testing.

The method may further include using the estimated entropy to adjust a measurement of distance between the transmitter and the mobile device.

The entropy of the CIR also exhibits strong correlation with ranging error, and can therefore be used to provide a correction to the distance determined from the original signal receipt, for example by time of arrival, time difference of arrival, received signal strength or any other known method. The location of the mobile device can therefore be determined with greater accuracy.

Embodiments of this second aspect may include some, all or none of the above described optional or preferred features.

The method of the second aspect is preferably, but not necessarily, used to control a system according to the second aspect below, including some, all or none of the optional or preferred features of those aspects.

At its broadest, a third aspect of the present invention provides a mobile device which is able to determine its location using the entropy of the channel impulse response of a received signal.

Accordingly a third aspect of the present invention preferably provides a mobile device having a receiver and a control unit, wherein: the receiver is arranged to receive a signal from a transmitter in a known location; and the control unit is arranged to: estimate the entropy of the channel impulse response of said signal; determine, from the estimated entropy, whether said signal includes components that have traversed a direct path and non-direct paths or consists of components that have traversed non-direct paths only; and determine the location of the mobile device using the information about the determined signal paths.

The mobile device method of this aspect uses an NLOS identification technique to distinguish channel conditions based on entropy estimation of the channel. Since the Channel Impulse Response (CIR) is a characterization of the multipath channel between a transmitter and a receiver, it is possible to devise an entropy metric in an information theoretic framework that yields a robust NLOS identification system.

Entropy of a signal is a measure of "information" in the signal and its computation typically involves estimating the probability density function (PDF) of the random variable through the very well known Shannon equation [36]. Since the CIR is a random process (in time and space), estimating its PDF provides full statistical characterization. As a result, from a statistical and information point of view, entropy is more robust than the lower order statistics such as the excess mean delay, RMS delay and kurtosis since they do not fully characterize the statistical behavior of the random variable.

The CIR is highly correlated with the channel condition, as is demonstrated experimentally below. Thus by examining the entropy of the CIR it is possible to distinguish between LOS and NLOS channels.

Results of experimental measurements of the CIR in different environments set out below verify the robustness of embodiments of this aspect. In particular the entropy of the CIR has a particular ability to detect the existence of a direct path element and thus is highly relevant to geolocation in NLOS environments.

The device of this aspect thereby harnesses the full statistical information in a CIR to implement a robust entropy-based channel identification algorithm. Below it is shown that embodiments of this algorithm are superior to existing techniques in particular RMS delay spread and kurtosis.

The control unit may be further arranged to, if it determines that the signal is received through a non-line of sight channel, determine from the estimated entropy whether the signal includes a direct path element which is attenuated or the signal does not include a direct path element.

Thus the control unit can distinguish the three possible channel conditions of: LOS/direct path; NLOS with a detectable direct path element; and NLOS without any detectable direct path element.

Embodiments of the present aspect provide for different approaches to the determination of the transmission channel according to the available information.

In one embodiment, the control unit determines whether said signal includes components that have traversed a direct path and non-direct paths or consists of components that have traversed non-direct paths only by comparing said estimated entropy to a known probability distribution function of entropy for each possible channel condition.

In a development of this embodiment, the comparison takes account of the known likelihoods of the transmission by each of the possible channel conditions.

In another embodiment the control unit determines whether a signal is received by a direct path or not by: starting from a null hypothesis that the signal consists only of components that have traversed non-direct paths and applying a Neyman-Pearson (NP) hypothesis test to the estimated entropy to determine whether a direct path component is present or not; and, if a direct path component is present, applying a binary Bayesian test to the estimated entropy to determine whether the direct path component is attenuated or not.

The above embodiments provide CIR-based NLOS identification techniques that estimate the entropy of CIR and identify the NLOS condition through hypothesis testing.

The control unit may be further arranged to use the estimated entropy to adjust a measurement of distance between the transmitter and the mobile device.

The entropy of the CIR also exhibits strong correlation with ranging error, and can therefore be used to provide a correction to the distance determined from the original signal receipt, for example by time of arrival, time difference of arrival, received signal strength or any other known method. The location of the mobile device can therefore be determined with greater accuracy.

The mobile device may further include a display, wherein the control unit is arranged to display the determined location of the mobile device. Thus the mobile device can show its location to a user. The display may show the location by means of an indicated location on an overlaid map or plan of the known area, or by a co-ordinate system, or by any other known approach.

The mobile device may further include a transmitter, wherein the control unit is arranged to transmit the determined location of the mobile device. Thus the mobile device can transmit its location to a receiver, which may be connected to a further control unit or computer system which is arranged to track and/or record the location of the mobile device, possibly along with other mobile devices.

Embodiments of this third aspect may include some, all or none of the above described optional or preferred features.

Entropy Estimation of Signals

Algorithm Overview

From information theory the entropy of a random variable X is given by [36]

$$\psi(X) = -E_X[\log_2 p_X] = -\int_{-\infty}^{\infty} p_X(x)\log_2 p_X(x)dx \quad (9)$$

where $p_x(x)$ is the PDF of X. In practice, direct evaluation of (9) is difficult because it is not easy to compute or estimate the entropy from real data. Typical methods rely on estimating the PDF through histograms [38, 39], order statistics [40, 41] or kernel methods [42, 43].

A more practical and efficient alternative technique to estimate the entropy of a random signal has been proposed by [44]. The proposed signal processing technique computes an estimate of entropy by estimating the PDF of the random variable. It has been proposed in [44, 45] that the PDF of a random variable X can be estimated simply by appealing to the theory of Power Spectral Density (PSD) estimation. An estimate of the PDF $\hat{p}_x(x)$ can be parameterized by a set of coefficients $\{a_k\}$ of an autoregressive (AR) model in the form of a PSD $S_W(x)$, where $1 \leq k \leq p$ is the number of parameters [44, 45] or $$\hat{p}_X(x) = S_W(x) = \frac{\sigma_W^2}{\left|1 - \sum_{k=1}^{p} a_k e^{-j2\pi kx}\right|^2} \quad (10)$$

where $\sigma_W^2$ is designed such that $\int_{-1/2}^{+1/2} S_W(f)df = 1$ since PSDs are different from PDFs in that they do not usually integrate to 1. The bounded support [−½, ½] ensures that the random variable is constrained between these values, since a general PDF is not periodic with period one as is imposed by the AR model [45]. This can be easily achieved by normalizing the data by $k\sigma_W$ where $\sigma_W$ is the standard deviation and k is a suitable parameter [45].

One way to clarify the modeling of the PDF by a PSD is to note that if X(ω, n) is a random process then we can find a process W(ω, n) that has a PSD that matches $p_x(x)$. One such process is W(ω, n)=$e^{j(nX+\phi(\omega))}$ where $\phi(\omega)$ is uniformly distributed over [0, 2π] and independent of X [44]. It can be easily shown that the autocorrelation of W, $R_W(k)$, is the first characteristic function of X. The relationship between the PDF and the PSD can then be highlighted through the following Fourier Transform relationships $$R_W(k) \xrightarrow{F} S_W(x) \quad (11a)$$

$$\phi_x(k) \xrightarrow{F} p_x(x). \quad (11b)$$

It is clear that if the autocorrelation $R_W(k)$ is equal to the $\phi_x(k)$ then $p_X(x)=S_W(x)$. As a result to estimate the PDF $\hat{p}_X(x)$ we can find an AR model of the form in (10). The parameterization in (10) is possible since a large enough model order can be shown to be capable of modeling any PDF in the $\|\cdot\|_\infty$ sense [44]. In order to estimate the model parameters in (10) based on available data $\{x_1, x_2, \ldots, x_N\}$ it is well known that the Yule-Walker equations relate the AR model parameters to the autocorrelation function [46]. The autocorrelation function in this case is the samples of the characteristic function given by [45]

$$F^{-1}\{p_X(x)\}=\phi_x(k)=E[e^{j2\pi xk}]=R_W(k) \quad (12)$$

where $\phi_x(k)$ is the characteristic function and $R_W(k)$ is the autocorrelation function of the underlying process W related to the PSD $S_W(x)$. The autocorrelation function essentially becomes samples of the characteristic function and in the remainder of the report $\phi_x(k)$ and $R_W(k)$ will be used interchangeably and they both refer to (11). To estimate the AR model parameters (ultimately estimate the PDF) we need to estimate the autocorrelation of the random process which can be given by the sample moment estimator $$\hat{R}_W(k) = \frac{1}{N_s} \sum_{n=0}^{N_s-1} e^{j2\pi kx(n)} \quad (13)$$

where k=0, ..., p and $N_s$ is the number of samples in the data vector. The AR model parameters can then be found by solving the Yule-Walker equations [45, 46]

$$\hat{R}_W \hat{a} = \hat{r}_W \quad (14)$$

$$\begin{bmatrix} \hat{R}_W(0) & \hat{R}_W(-1) & \ldots & \hat{R}_W(-(p-1)) \\ \hat{R}_W(1) & \hat{R}_W(0) & \ldots & \hat{R}_W(-(p-2)) \\ \vdots & \vdots & \ddots & \vdots \\ \hat{R}_W(p-1) & \hat{R}_W(p-2) & \ldots & \hat{R}_W(0) \end{bmatrix} \begin{bmatrix} \hat{a}(1) \\ \hat{a}(2) \\ \vdots \\ \hat{a}(p) \end{bmatrix} = \begin{bmatrix} \hat{R}_W(1) \\ \hat{R}_W(2) \\ \vdots \\ \hat{R}_W(p) \end{bmatrix}$$

using the Levinson-Durbin recursion. An estimate of $\hat{\sigma}_W^2$ can be computed (once $\hat{a}_k$ are estimated) using $$\hat{\sigma}_W^2 = \hat{R}_W(0) - \sum_{k=1}^{p} \hat{a}(k)\hat{R}_W(-k) \qquad (15)$$

which can also be computed using the Levinson-Durbin recursion.

Once the AR parameters of the PSD that models the PDF are computed then the estimate of entropy can be computed by $$\hat{\psi} = -\int_{-1/2}^{1/2} \hat{p}_X(x)\log_2 \hat{p}_X(x)dx = -\int_{-1/2}^{1/2} S_W(x)\log_2 S_W(x)dx \qquad (16)$$

A more relevant/practical expression can be obtained using Plancherel-Parseval formula to the right-hand side of (16) [44] which yields $$\hat{\psi} = -\sum_{k=-\infty}^{\infty} R_W(k)C_W^*(k) \qquad (17)$$

where $R_W(k)$ is the $k^{th}$ correlation coefficient and $C^*_W(k)=F^{-1}\{\log_2 S_W(x)\}$ is the $k^{th}$ component of its cepstrum [46]. Since $S_W(x)$ is real, both $R_W(k)$ and $C^*_W(k)$ have Hermitian symmetry and thus (17) can be given by $$\hat{\psi} = -2Re\left\{\sum_{k=0}^{\infty} R_W(k)C_W^*(k)\right\}. \qquad (18)$$

Both $R_W(k)$ and $C^*_W(k)$ can be computed recursively or $$R_W(k) = \sum_{i=1}^{p} a_i R_W(k-i) + \sigma_W^2 \delta(k) \qquad (19)$$

$$C_W(k) = \begin{cases} \log\sigma_W^2, & \text{if } k = 0 \\ h(k) - \sum_{i=1}^{k-1} \left(\frac{i}{k}\right)C_W(i)h(k-i), & \text{if } k > 0 \end{cases} \qquad (20)$$

where $h(k)$ is the impulse response of the AR system and it also can be computed recursively $$h(k) = \sum_{i=1}^{p} a_i h(k-i) + \delta(k) \qquad (21)$$

Figure 9:
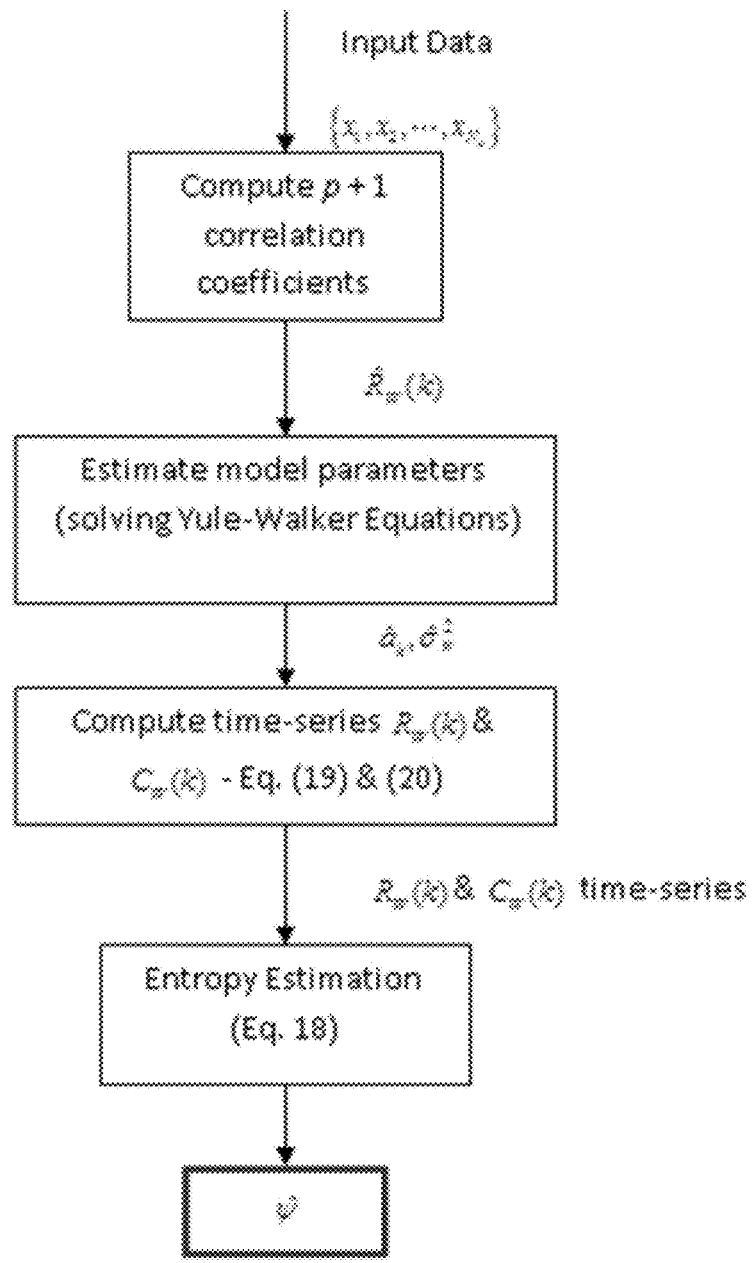
FIG. 9 shows the steps in an estimation of entropy.

The entropy estimation procedure of an input sequence of data $\{x_1, x_2, \ldots, x_N\}$ is summarized in FIG. 9.

Practical Considerations

In practice, modeling a PDF accurately using the AR technique requires a long AR model, i.e. a large number of AR coefficients. It is well known from spectral estimation theory that too low a model order will produce inadequate resolution which yields to estimator bias and a high model order results in loss of stability of the estimate which produces spurious peaks, i.e. large variance [44, 45].

To address the long AR model problem, the AR parameters can be obtained as a regularized least-squares solution [44, 47]

$$\hat{a}=(\hat{R}_W+\lambda\Gamma_k)^{-1}\hat{r}_W \qquad (22)$$

where $\tau_k$ is the diagonal matrix with elements $[\Gamma]_{ii}=i^{2k}$ incorporating the prior knowledge about the "smoothness" of the spectrum, see [47] for further details. $\lambda$ is a hyperparameter that balances a fidelity to the data and a smoothness prior [48]. A selection rule for $\lambda$ has been derived in [47, 48] which minimizes the following marginal likelihood $$L(\lambda)=\log(\det(\hat{R}_W+\lambda\Gamma_k))-p\log\lambda-N\log(\sigma_W^2) \qquad (23)$$

where $\sigma_W^2$ ensures that the AR probability distribution is properly normalized.

Recursive Implementation

Most of the entropy estimation equations in the previous section can be computed recursively. The correlation sequence in (8) can be estimated recursively by $$R_W^{N_s}(k) = \frac{1}{N_s}\sum_{n=0}^{N_s} e^{j2\pi kx(n)} \qquad (24)$$

$$= \frac{N_s-1}{N_s}R_W^{N_s-1}(k) + \frac{1}{N_s}e^{j2\pi kx(N_s)}.$$

Adaptive entropy estimation can be achieved by recursively computing the autocorrelation matrix [44]

$$\hat{R}_W^{n+1} = \frac{1}{n+1}\left[n\mu\hat{R}_W^{(n)} + \zeta(n+1)\zeta(n+1)^T\right] \qquad (25)$$

where $\mu$ is a forgetting factor and $\zeta(n+1)^T=[e^{-j(x_{n+1}+\phi)}, \ldots, e^{-j(px_{n+1}+\phi)}]$. The AR parameters can also be recursively computed, which avoids matrix inversion required in (22). The recursive regularized least squares solution can be computed using a gradient approach [44]

$$\hat{a}^{(n+1)}=\hat{a}^n+\beta(\hat{R}_W^{(n)}+\lambda\Gamma_k)\hat{a}^{(n)}-\hat{r}_W^{(n)}. \qquad (26)$$

At each stage after updating the autocorrelation function and computing the recursive model parameters equations (18)-(20) can be used to compute the entropy recursively.

Entropy-based NLOS Identification and Classification

In embodiments of the present invention, NLOS identification techniques are provided which are based on the concept of entropy estimation of the CIR. The entropy of a signal, from information theory, measures the "information" associated with a random variable [36]. Thus harnessing the information capabilities of entropy to distinguish between different channel conditions is a robust approach to the NLOS identification problem.

The entropy of the CIR is given by $$\psi(X) = -E_X[\log_2 p_X] \qquad (27)$$

$$= -\int_{-\infty}^{\infty} p_X(x)\log_2 p_X(x)dx$$

where $p_x(X)$ is the PDF of the CIR. In the ideal case the CIR is a summation of impulses but in reality, the ideal CIR is filtered by the pulse shape of the signal and is represented as an envelope signal with discrete samples $x=[x_1, x_2, \ldots, x_N]^T$ where N number of samples. Using the proposed entropy estimation algorithm discussed in the previous section it is possible to obtain accurate entropy estimates of the CIR.

In this section we first demonstrate the robustness of the entropy of the CIR as a metric to identify NLOS channels through channel measurements in typical indoor office environments. Then, different hypothesis testing frameworks are discussed depending on the available a priori information (conditional distributions of the entropy metric in different channel conditions).

Entropy—A Robust Metric for NLOS Identification

In this section the robustness of the entropy as an NLOS channel identification metric is demonstrated and verified in this report through channel measurements in typical indoor office environments. These highlight the strong correlation between entropy and ranging error and demonstrate through statistical evaluation of entropy in different channel conditions, its superior NLOS channel identification capabilities.

Using the entropy estimation techniques presented above, it is possible to estimate the PDF of any random variable through AR modeling. Since the CIR is a random process in time and space, the entropy will vary according to the statistics of the CIR. Thus it is possible to harness the entropy estimate of the CIR in order to identify NLOS channels.

In this section the effectiveness of entropy as an NLOS identification metric is evaluated and verified through extensive channel measurements in a typical indoor office environment. Using a frequency domain measurement system we generate a database of CIR measurements in a variety of locations and channel conditions (LOS and NLOS). Details of the measurement system and technique can be found in [11].

Some of the measurements are in open space, and for others the transmitter (TX) and receiver (RX) are separated by light obstructions and in the severe cases the TX/RX are obstructed by heavier obstacles (multiple concrete walls, elevator shaft, etc.).

The database is then classified into the three channel conditions LOS, NLOS-DP and NLOS-NDP. The classification of LOS channels is straight forward, since it is possible through physical examination of the TX/RX during measurements.

The classification of NLOS-DP and NLOS-NDP, however, is carried out in the post-processing. Since the distances between TX/RX are known with high accuracy (a priori measured), the CIRs are examined offline and they can be separated according to arrival paths within the time resolution of the system. If a signal is present within the expected arrival time of the DP, then the CIR is classified as NLOS-DP, otherwise as NLOS-NDP (details of the post-processing technique can be found in [11]).

Once the database is segregated according to this criterion it is possible to investigate and evaluate the entropy as NLOS identification metric. Particularly interest is paid to the correlation of the entropy with the ranging error. This indicates that as the mobile device moves from LOS to NLOS-DP and to NLOS-NDP, entropy should exhibit some correlation with the degeneration of the channel condition. This correlation is important since entropy can identify NLOS channels and more importantly provide an indication of the severity of the NLOS bias affecting the ranging measurement.

Figure 10:
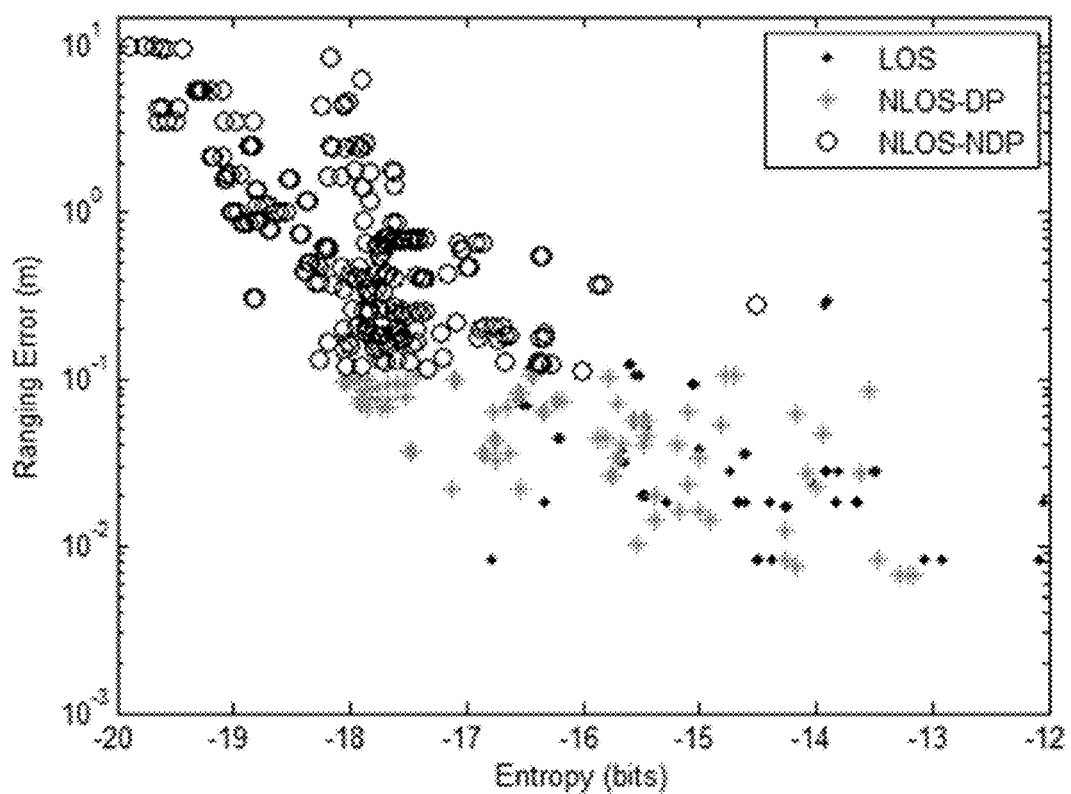
FIG. 10 shows the entropy of the CIRs for three channel conditions plotted against the ranging error.

In FIG. 10 the entropy of the CIRs for the three channel conditions are plotted against the ranging error. Note that there is a strong positive correlation which indicates that entropy values belonging to the unfavorable NLOS-NDP condition results in significant ranging errors up to 10 meters.

As the ranging condition deteriorates, entropy becomes more negative. The CIR "loses" multipath components as the mobile devices moves from LOS to NLOS-NDP conditions and entropy reflects this loss of information. In addition FIG. 10 shows a strong correlation between the entropy of the CIR and the error. This indicates that entropy can not only be used to identify the channel conditions but can also provide good information regarding the extent of ranging error bias in the measurement (i.e. compare the ranging error for entropy values around −20 compared to −13). This point is very important since this information can be integrated in the NLOS mitigation stage and the biases can be mitigated accordingly.

Figure 11:
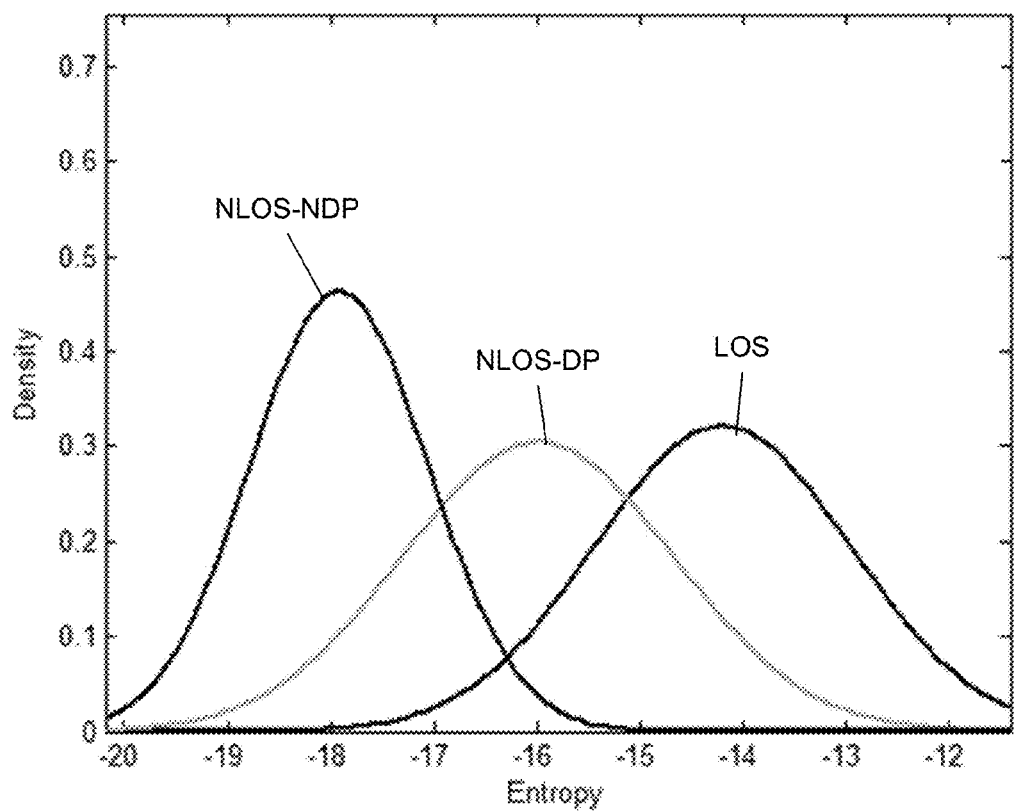
FIG. 11 shows the modeling of the histogram of the entropy of measured CIRs in different channel conditions by a Gaussian distribution.

The more important attribute of any NLOS identification metric is the statistical separation of the conditional PDFs in the different channel conditions. The histogram of the entropy of measured CIRs in different channel condition can be modeled by a Gaussian distribution which is shown in FIG. 11. In addition to the positive correlation in FIG. 10, the entropy histograms in FIG. 11 clearly indicate the robustness of the NLOS identification and classification capabilities of the entropy metric.

Figure 12:
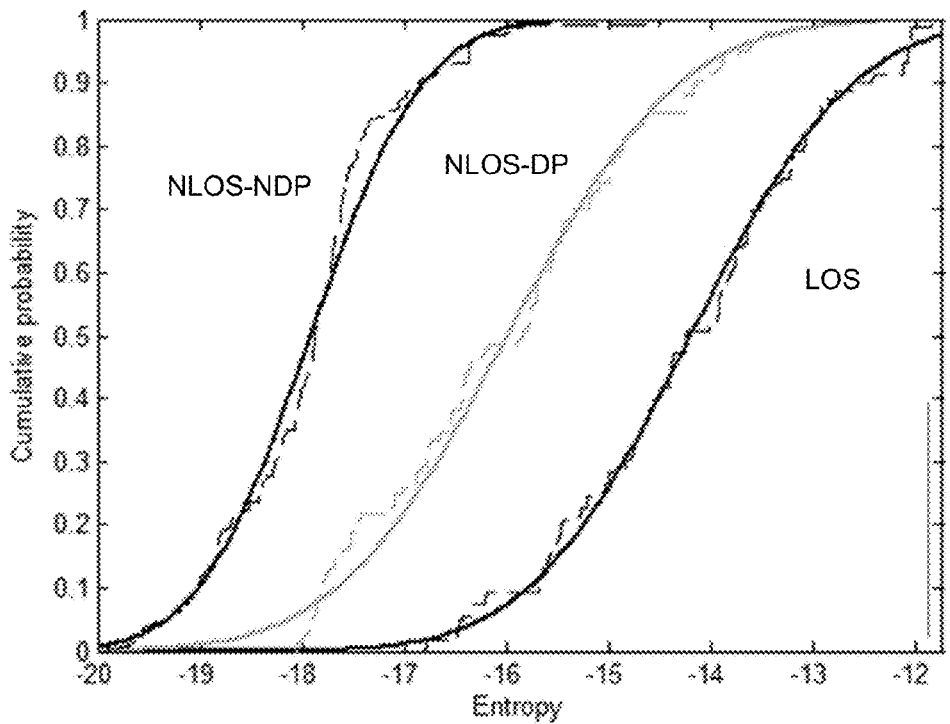
FIG. 12 shows the normal distribution modeling of entropy compared to the CDF for different channel conditions.

The Gaussian modeling of the PDF of entropy under different conditions can be further verified by evaluating the CDF of the data compared to the models which is illustrated in FIG. 12. FIG. 12 shows the normal distribution modeling of entropy (dashed lines) compared to the CDF for the corresponding channel conditions. The normal distribution models can therefore provide tractable calculation of the probability of false alarm and detection in signal detection theory.

The normal distribution illustrates a good fit to the data and as a result can be used in the NLOS identification techniques highlighted in the remainder of this section. The conditional PDF of entropy can be given by $$p_\psi(\psi \mid H_i) = \frac{1}{\sqrt{2\pi\sigma_i^2}} \exp\left[\frac{(\psi - \mu_i)^2}{2\sigma_i^2}\right] \quad (28)$$

were i=1, 2, 3 and $H_i$ and is the corresponding hypothesis.

Figure 13A:
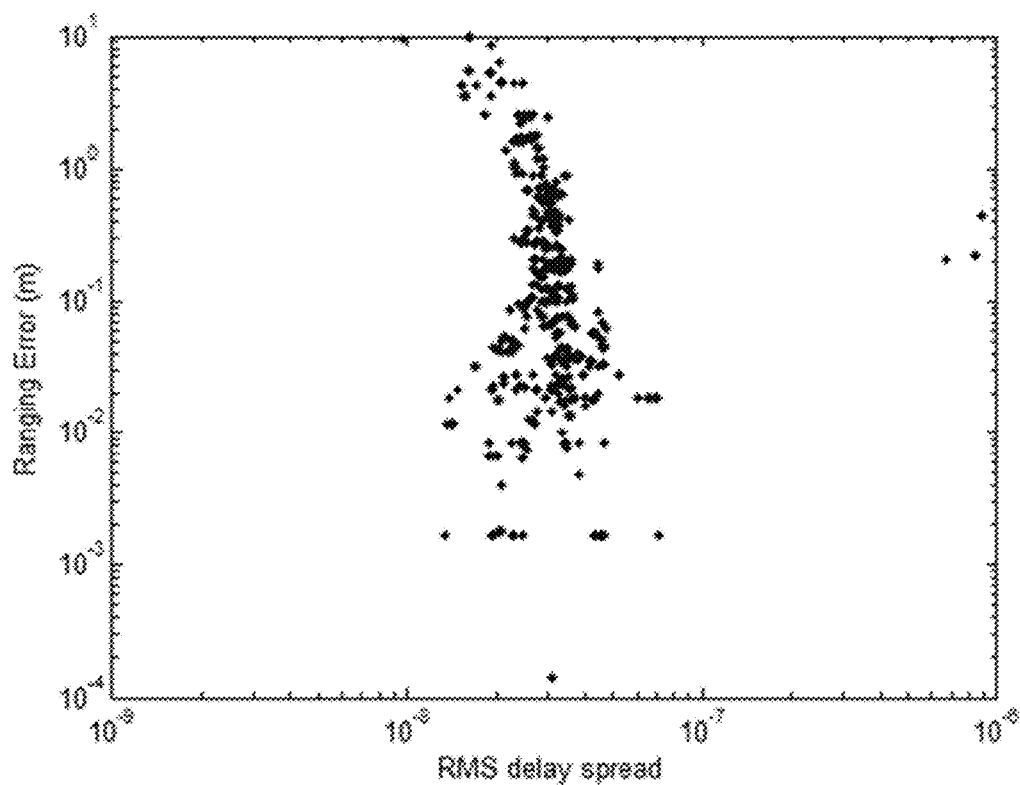
FIGS. 13a and 13b illustrate the correlation between the ranging error and RMS delay spread and kurtosis, respectively.
Figure 13B:
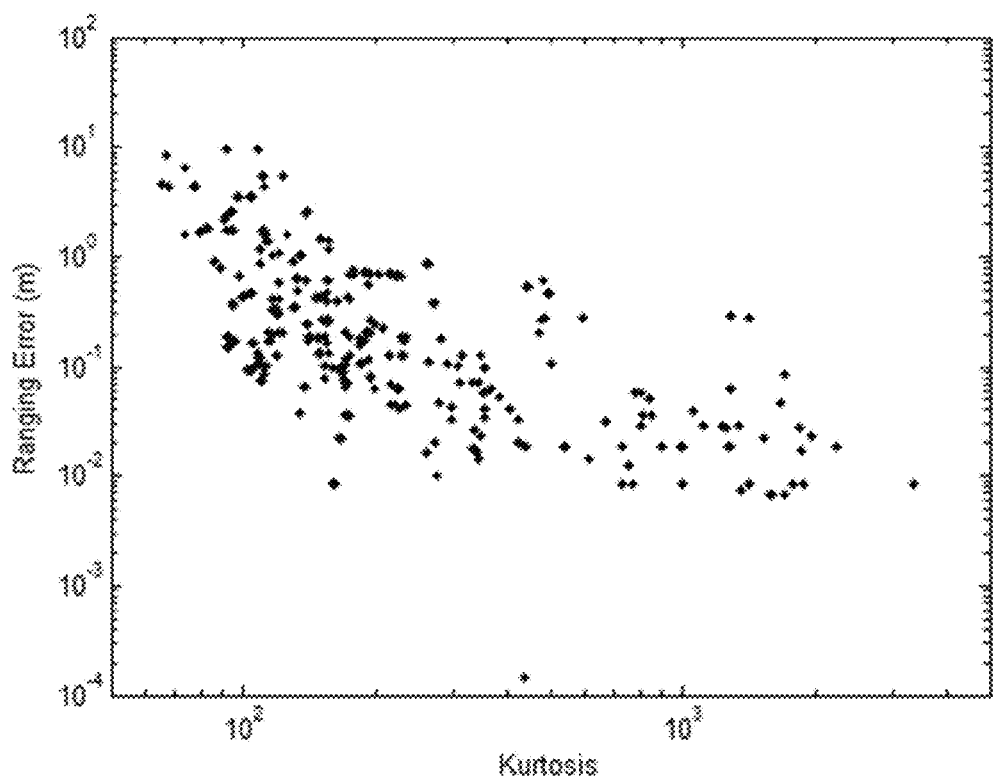

To highlight the advantage of the use of the entropy as set out in the embodiments of the present invention compared to existing state of the art techniques, FIGS. 13a and 13b illustrate the correlation between the error and RMS delay spread and kurtosis, respectively. It is clear that they exhibit weaker correlation. In particular, the RMS delay spread has weak correlation with error, which means that it is difficult to infer the extent of ranging error.

Figure 14:
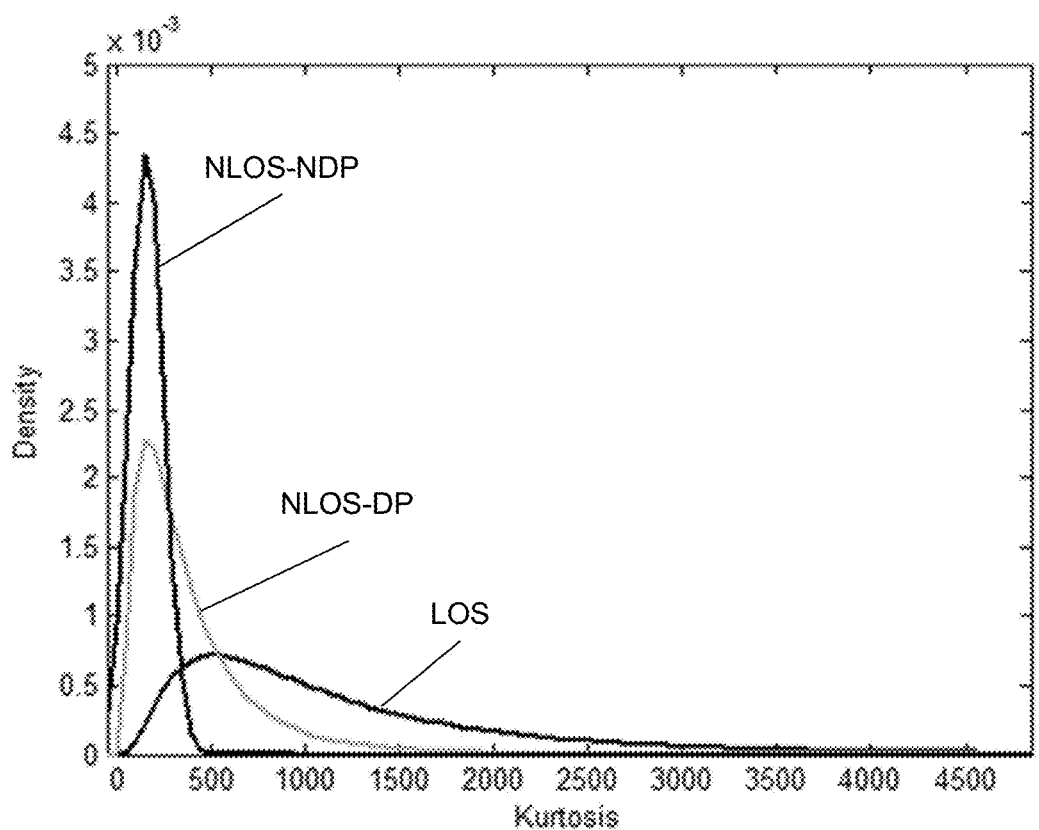
FIG. 14 shows the kurtosis histogram (obtained from the CIR measurements) under different channel conditions.

Although kurtosis has a slight correlation with ranging error, it is particularly difficult to distinguish between the ranging states as highlighted in FIG. 14 which shows the kurtosis histogram (obtained from the CIR measurements) under different channel conditions. It is clear that for kurtosis values in the range of 0-500 there is significant ambiguity which highlights the limitations in the LOS/NLOS identification capabilities of this factor.

In [29] the kurtosis metric was best modeled by the log-normal distribution which is similarly adopted in FIG. 14.

As indicated above, for the same measurement data, the NLOS identification capability is weaker than entropy (compare FIGS. 11 and 14). Specifically from the kurtosis histograms, it is difficult to distinguish between NLOS-DP and NLOS-NDP. Also distinguishing between LOS and NLOS can have some ambiguities due the large variance of kurtosis under LOS.

The kurtosis results clearly indicate that for many locations under different NLOS conditions, the CIR exhibit similar "peakedness" to LOS and as a result it is difficult to distinguish between the conditions accurately. This was similarly observed by [28, 29] where kurtosis alone exhibited low probability of detection in many environments which prompted the authors to introduce a joint metric (mean excess delay, RMS delay spread and kurtosis) to achieve reasonable NLOS identification performance.

Entropy on the other hand (as seen in FIG. 11) exhibits a better statistical separation between the conditional PDFs—which means higher probability of detection for a given false alarm probability. The superiority of entropy can be explained by the fact that it provides a full statistical characterization of the CIR and thus harnesses more of the available information compared to kurtosis.

Traditional Binary Hypothesis Testing

In the "traditional" NLOS identification approach a binary hypothesis test is used to distinguish between LOS ($H_0$) and NLOS ($H_1$)) or $$\begin{cases} H_0 : \hat{d} = d + b_m + \tilde{n} \\ H_1 : \begin{cases} \hat{d} = d + b_m + b_{pd} + \tilde{n} \\ \hat{d} = d + b_m + b_{pd} + b_B + \tilde{n} \end{cases} \end{cases} \quad (29)$$

Note that in almost all the literature on NLOS identification, the two conditions NLOS-DP and NLOS-NDP are usually either combined into one or the former is ignored. Also the effect of multipath error ($b_m$) is usually ignored. This approach has limitations since this "black" or "white" viewpoint is not an accurate reflection of reality and thus any identification algorithm devised with these assumptions will lack in accuracy and robustness.

Figure 15:
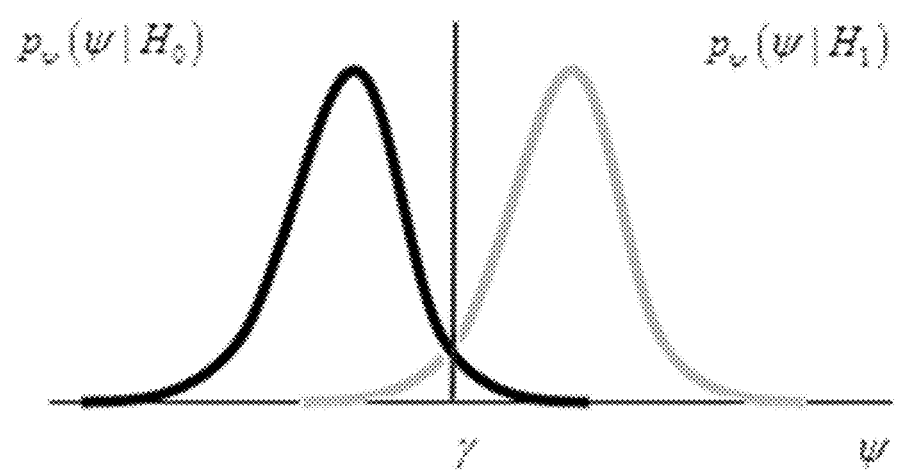
FIG. 15 illustrates a hypothesis test for distinguishing between the conditional PDFs of entropy of different signals.

However, in many cases the a priori information of the three different conditions might not be available (such as existing IEEE channel models where only LOS/NLOS classification exists—mainly due to the fact that the models were developed from a communication perspective without specific attention to the geolocation problem). In this case, it is possible to use the binary formulation in (29). A binary hypothesis test can be devised where we are particularly interested in distinguishing between the conditional PDFs of entropy $p_\psi(\psi|H_0)$ and $p_\psi(\psi|H_1)$, as shown in FIG. 15. Where the null hypothesis is the LOS condition (left hand distribution) and the alternative hypothesis is the NLOS condition (right hand distribution—both the -DP and -NDP sub-conditions are usually grouped under the alternative hypothesis).

The optimum detection can be achieved through the well-known Neyman-Pearson (NP) theorem where the decision threshold $\gamma$ is determined by maximizing the probability of detection $P_D$ for a given probability of false alarm $P_{FA}$ [49, 50]. As a result for a given $P_{FA}$ a likelihood ratio test (LRT) is given by $$L(\psi) = \frac{p_\psi(\psi | H_1)}{p_\psi(\psi | H_0)} \underset{H_0}{\overset{H_1}{\gtrless}} \gamma \quad (30)$$

where the threshold can be determined based on a certain $P_{FA}$ given by $$P_{FA} = \int_\gamma^\infty p_\psi(\psi | H_0) d\psi \quad (31)$$

Similarly the achieved probability of detection $P_D$ is given by $$P_D = \int_\gamma^\infty p_\psi(\psi | H_1) d\psi. \quad (32)$$

Figure 16:
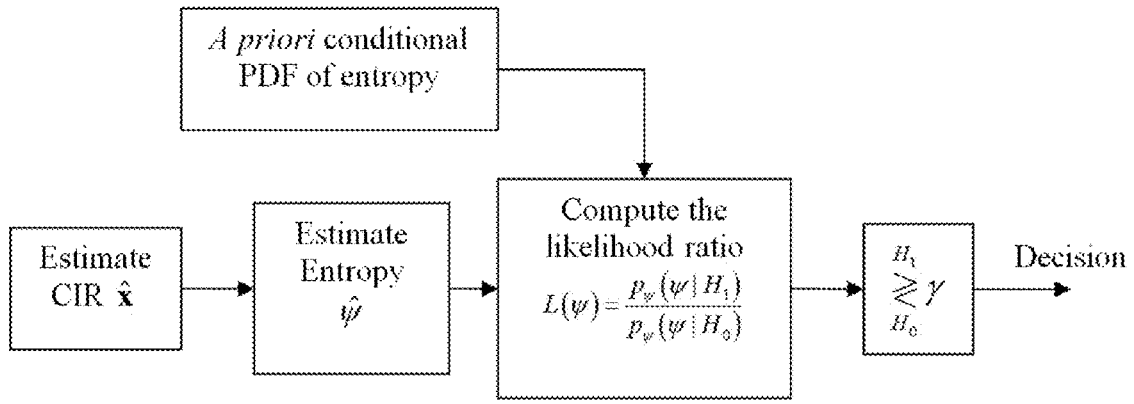
FIG. 16 illustrates a method of NLOS identification under a binary hypothesis test according to an embodiment of the present invention.

FIG. 16 illustrates a method of NLOS identification under a binary hypothesis test according to an embodiment of the present invention. The optimum detector can be achieved using the NP theorem for a given PFA. Note that in most CIR-based identification techniques the a priori information that characterizes the identification metric is required. This is typically available in literature through numerous channel models and channel measurement for different wireless systems.

Ternary Hypothesis Testing: Bayes' Risk

If the a priori statistical characterization of entropy in the three channel conditions LOS, NLOS-DP and NLOS-NDP is available then another approach is to construct a multiple (ternary in this case) hypothesis test or $$\begin{cases} H_0 : \hat{d} = d + b_m + \tilde{n} \\ H_1 : \hat{d} = d + b_m + b_{pd} + \tilde{n} \\ H_2 : \hat{d} = d + b_m + b_{pd} + b_B + \tilde{n} \end{cases} \quad (33)$$

where the $H_0$, $H_1$ and $H_2$ represent LOS, NLOS-DP and NLOS-NDP, respectively. Note that this classification provides a platform for robust identification since $H_2$ typically is the cause of significant ranging errors in TOA-based geolocation systems.

In addition, (33) indicates that for some NLOS channels, when the DP is detected, the accuracy is acceptable. For a multiple hypothesis problem a NP approach can be extended from the binary case, however, a Bayesian approach is more popular in literature due to the practical formulation of the problem [49, 50]. The basic idea behind the Bayesian approach to detection and identification is to reach a decision that minimizes the Bayesian Risk given by [49]

$$\Re = \sum_{i=0}^{M-1} \sum_{j=0}^{M-1} C_{ij} P(H_i | H_j) P(H_j) \quad (34)$$

where $C_{ij}$ is the cost assigned to the decision to choose $H_i$ when $H_j$ is true. Typically the following particular cost assignment is assumed $$C_{ij} = \begin{cases} 0 & i = j \\ 1 & i \neq j. \end{cases} \quad (35)$$

This implies that the cost of making an error is higher than the cost of making the correct decision. In addition the cost in (35) can be modified to emphasize that the cost of making an error in DP estimation can be higher. For example, $C_{02} = C_{20} > C_{12} = C_{21} > C_{01} = C_{10}$.

Using (35) the decision rule to minimize (34) is given by [49]

$$C_i(\psi) = \sum_{\substack{j=0 \\ j \neq i}}^{M-1} P(H_j | \psi) = \sum_{j=0}^{M-1} P(H_j | \psi) - P(H_i | \psi). \quad (36)$$

$C_i(\psi)$ is minimized by maximizing $P(H_i|\psi)$ which yields the following decision rule to decide for $H_k$ [49]

$$P(H_k|\psi) > P(H_i|\psi) \quad i \neq k \quad (37)$$

where $P(H_i|\psi) = p(\psi|H_i) P(H_i)/p(\psi)$ is the a posteriori probability. Since (37) is a threshold comparison between a posteriori probabilities this is often referred to as the M-ary maximum a posteriori (MAP) decision rule [49]. If the prior probabilities P(H$_i$) are known to be equal then the MAP becomes the maximum likelihood (ML) decision rule or decide H$_k$ if $$p(\psi|H_k) > p(\psi|H_i)\ i \neq k \tag{38}$$

Figure 17:
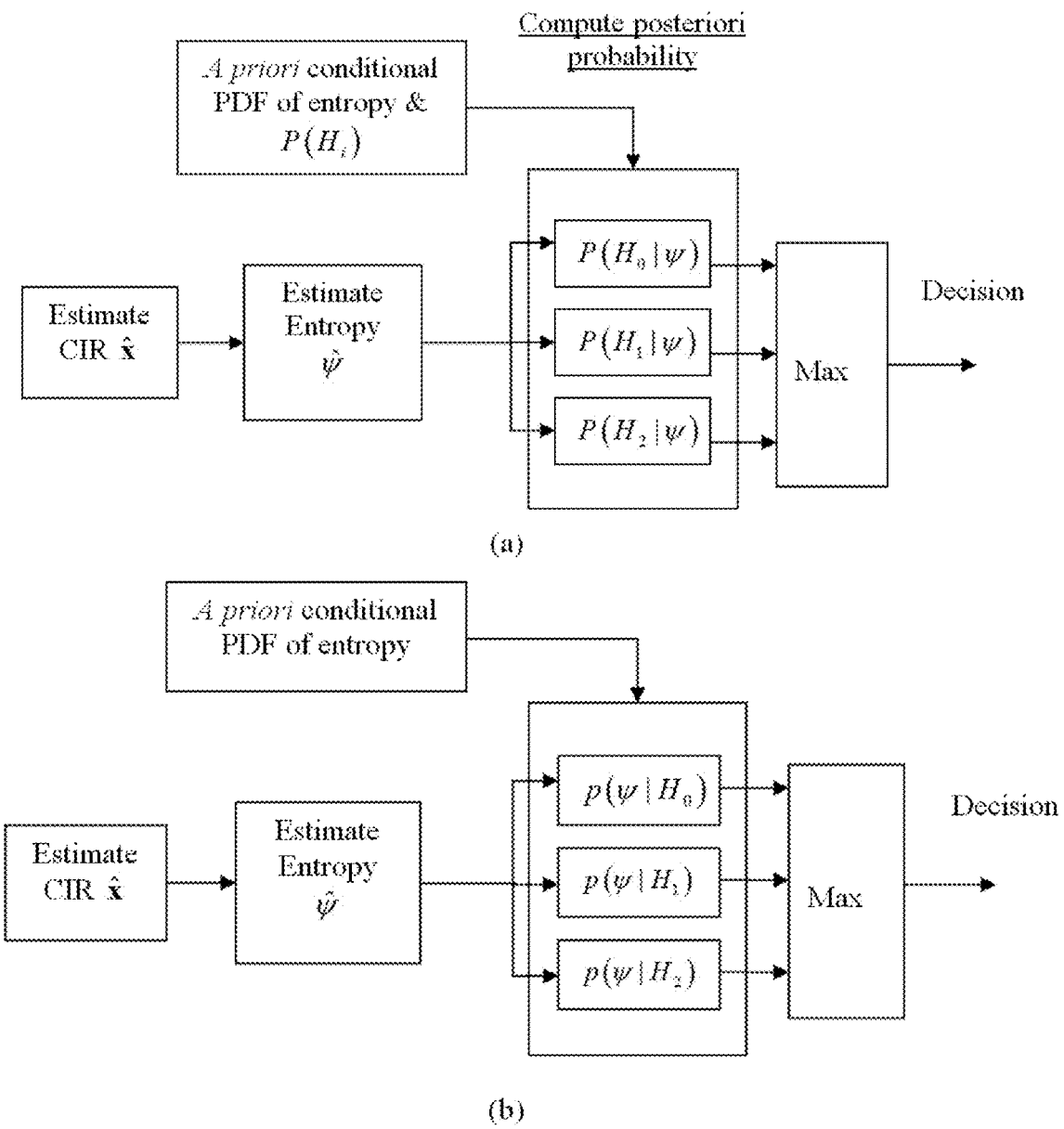
FIG. 17 illustrates an entropy-based Bayesian approach to NLOS identification according to an embodiment of the present invention.

FIG. 17 illustrates an entropy-based Bayesian approach to NLOS identification according to an embodiment of the present invention. FIG. 17(a) shows a MAP detector where a priori PDFs and P(H$_i$) are available. FIG. 17(b) shows a ML detector where a priori PDFs are available but P(H$_i$) assumed equal or P(H$_0$)=P(H$_1$)=P(H$_2$)=⅓.

One difficulty of this approach is the requirement that the a priori probabilities to be known or at least assumed to be all equal. This assumption might be valid in some environments, but generally P(H$_2$), which is the probability of the absence of DP (NLOS-NDP) is difficult to determine because of the complexity of the propagation environment.

Accordingly, a further embodiment of the present invention provides an alternative robust NLOS identification approach which takes advantage of the CIR entropy effectively.

Hybrid NP-Bayesian Entropy-based NLOS Identification

An alternative NLOS identification technique is to adopt a radar object detection approach, which is a detection and classification problem. In this technique we propose that the null hypothesis is the NLOS-NDP which indicates that the DP is absent. The idea then is to devise a detection scheme that would detect the presence of the DP. Once the DP is detected it can be further classified into LOS or NLOS.

Obviously the null hypothesis is always under NLOS condition but it specifically indicates the "absence" of the DP. This is analogous to the radar detection problem where the DP is the object we wish to detect. Similarly, once an object is detected in radar applications it would be of value to know whether the object is a plane or a helicopter, for example. Thus in the NLOS identification domain, the DP is the entity that we would like to detect and once it is detected we are further interested to know whether it is a DP under LOS or NLOS (classification).

This approach has not been addressed in literature and we believe is more appropriate to geolocation in harsh NLOS multipath environments. This would also indicate that we always assume that the DP is absent unless the entropy measurements indicate otherwise.

The NLOS identification approach we propose in this embodiment is similar to [51], where a multiple hypothesis test is used to detect and classify flying objects. By observing the entropy of the CIR we wish to detect the DP and classify the condition in which it occurred. Thus $$\begin{cases} H_0 : \hat{d} = d + b_m + b_{pd} + b_B + \tilde{n} \\ H_k : \hat{d} = d + b_k + \tilde{n} \end{cases} \tag{39}$$

$$k = 1, 2;$$
$$b_1 = b_m + b_{pd},$$
$$b_2 = b_m$$

Note that we have reversed the ordering of the hypothesis. The null hypothesis in (29) and (33) was the LOS condition while here the null hypothesis is the NLOS-NDP condition. This is a multiple hypothesis problem and we are interested in detecting the existence of the DP and then classifying the detection in LOS or NLOS. The latter again typically occurs in scenarios where the TX/RX is obstructed by light objects such as wooden wall/glass window, etc. In many instances for a given floor map we can obtain the a priori probability for a TX/RX measurement to be in LOS or NLOS (physically obstructed or not). However, it is particularly difficult to obtain the a priori probability of NLOS-NDP or P(H$_0$) The difficulty stems from the fact that for a given multipath environment it difficult to identify when the DP can be detected or not by just examining the floor plan due to the complex interaction of the signal with the obstructions and random movements of the devices relative to the obstruction. Because of this difficulty the Bayesian Risk approach outlined in the previous section cannot be practically implemented.

Instead a hybrid NP-Bayesian approach can achieve realistically robust detection performance. We adapt a similar technique proposed by [51] where NP is used to detect whether the DP exists or not (H$_0$ versus H$_1$ and H$_2$). Then once the DP is detected a Bayesian approach can be used to classify whether it is under LOS or NLOS condition. Formally the NP detection hypothesis tests are given by $$L_{01}(\psi) = \frac{p_\psi(\psi|H_1)}{p_\psi(\psi|H_0)} \underset{discard\ H_1}{\overset{discard\ H_0}{\gtrless}} \gamma_1 \tag{40}$$

and $$L_{02}(\psi) = \frac{p_\psi(\psi|H_2)}{p_\psi(\psi|H_0)} \underset{discard\ H_2}{\overset{discard\ H_0}{\gtrless}} \gamma_1 \tag{41}$$

where $p_\psi(\psi|H_k)$ are the conditional PDFs of the entropy. $\gamma_1$ and $\gamma_2$ are the decision thresholds for the NP test and they are determined for a given $P_{FA}$. Once the NP tests detect the existence of the DP in the CIR (through the entropy test metric) then a binary Bayesian technique can be adopted or $$L_{12}(\psi) = \frac{p_\psi(\psi|H_1)}{p_\psi(\psi|H_2)} \underset{H_2}{\overset{H_1}{\gtrless}} \frac{P(H_2)}{P(H_1)}. \tag{42}$$

In the case that the a priori probabilities in (42) are equal then the MAP detector test becomes the ML detector or $$p_\psi(\psi|H_1) \underset{H_2}{\overset{H_1}{\gtrless}} p_\psi(\psi|H_2). \tag{43}$$

The thresholds $\gamma_1$ and $\gamma_2$ in (40) and (41) can be determined by the NP criteria for a given $P_{FA}$. For the local false alarm probabilities $P_{FA1}$ and $P_{FA2}$ the thresholds can be determined by $$P_{FA1} = \int_{\gamma_1}^{\infty} p_\psi(\psi|H_1)d\psi \tag{44}$$

$$P_{FA2} = \int_{\gamma_2}^{\infty} p_\psi(\psi|H_2)d\psi \tag{45}$$

The global PFA is related to the local PFAs through the following [51]

$$P_{FA}P_{FA1} + P_{FA2} - P_{FA1}P_{FA2}. \tag{46}$$

Figure 18:
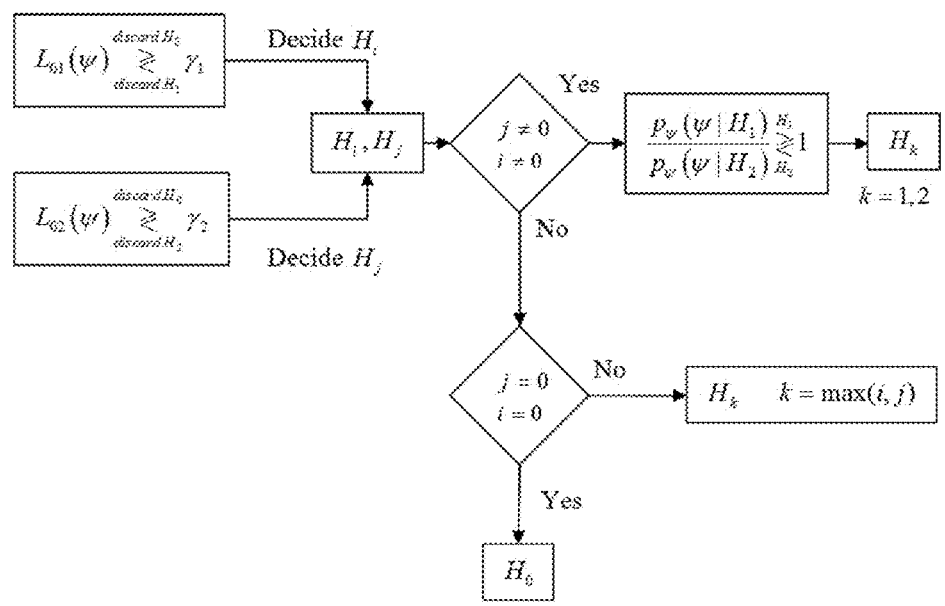
FIG. 18 illustrates an entropy-based NLOS identification technique according to an embodiment of the present invention which uses a hybrid NP and Bayesian approach.

FIG. 18 illustrates an entropy-based NLOS identification technique according to an embodiment of the present invention which uses a hybrid NP and Bayesian approach. The DP is first detected through a NP approach between $H_0$ and $H_1/H_2$. Then once the DP is detected a Bayesian method can be used to classify the channel condition further to LOS or NLOS-DP.

Implementation

The systems and methods of the above embodiments may be implemented at least partly in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. The data storage may comprise RAM, disk drives or other computer readable media. The computer system may include a plurality of computing devices connected by a network and able to communicate with each other over that network.

The methods of the above embodiments may be provided as one or more computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] N. Patel, Strategy Analytics: The $10 Billion Rule: Location, Location, Location, p. 7, Navigation: Wireless Media Strategies, May 20, 2011.

[2] K. Pahlavan, X. Li and J. P. Makela, "Indoor geolocation science and technology," *IEEE Communications Magazine*, vol. 40, no. 2, pp. 112-118, February, 2002.

[3] M. P. Wylie and J. Holtzman, "The non-line of sight problem in mobile location estimation," *Proc. 5th IEEE Int. Conf Universal Personal Communications*, vol. 2, pp. 827-831, 1996.

[4] J. Borras, P. Hatrack and N. B. Mandayam, "Decision Theoretic Framework for NLOS Identification," *Proc. 48th IEEE Vehicular Technology Conference (VTC98)*, pp. 1583-1587, vol. 2, Ottawa, Ont. Canada, May 1998.

[5] S. Venkatraman and J. Caffery, Jr., "A statistical approach to non-line-of-sight BS identification," *Proc. IEEE 5th Int. Symp. Wireless Personal Multimedia Communications (WPMC 2002)*, vol. 1, pp. 296-300, 2002.

[6] K. Yu and Y. J. Guo, "Non-line-of-sight detection based on TOA and signal strength," *Proc. IEEE 19th Intl Symp. On Personal, Indoor and Mobile Radio Communications (PIMRC)* 2008, pp. 1-5, September 2008.

[7] K. Yu and Y. J. Guo, "Statistical NLOS identification based on AOA, TOA and Signal Strength," *IEEE Trans. on Vehicular Tech.*, vol. 58, no. 1, pp. 274-286, January 2009.

[8] R. Diamant, H.-P. Tan and L. Lampe, "NLOS identification using a hybrid TOA-signal strength for underwater acoustic localization," Proc. IEEE OCEANS 2010, pp. 1-7, September 2010.

[9] C. Duan, N. Alsindi, J. Zhang, Mitsubishi Electric Research Laboratories, Inc. (2009), Method for Estimating Condition of Wireless Channels, U.S. Pat. Application 2010/0203839.

[10] S. Gezici, H. Kobayashi and H. V. Poor, "Non-parametric non-line-of-sight identification," *Proc. IEEE 58th Vehicular Technology Conf (VTC 2003 Fall)*, Vol. 4, pp. 2544-2548, 2003.

[11] N. Alsindi, B. Alavi, K. Pahlavan, "Measurement and modeling of Ultra Wideband TOA-based ranging in indoor multipath environments," *IEEE Transactions on Vehicular Technology*, pp. 1046-1058, vol. 58, no. 3, March 2009.

[12] S. Al-Jazzar and J. Caffery, Jr., "New algorithms for NLOS identification," *IST Mobile and Wireless Commun. Summit* 2005, Dresden, Germany, 2005.

[13] F. Benedetto, G. Giunta, A. Toscano and L. Vegni, "Dynamic LOS/NLOS statistical discrimination of wireless mobile channels," *Proc. IEEE 65th Vehicular Technology Conference*, pp. 3071-3075., Spring 2007.

[14] N. Alsindi, M. Heidari and K. Pahlavan, "Blockage identification in indoor UWB ranging using multi band OFDM signals," *Proc. IEEE Wireless Communications and Networking Conference (WCNC)*, pp. 3231-3236, Las Vegas, Nev., USA, April 2008.

[15] P.-C. Chen, "A non-lin-of-sight error mitigation algorithm in location estimation," *Proc. IEEE Wireless Communications and Networking Conference (WCNC)*, vol. 1, pp. 316-320, New Orleans, La., USA, September 1999.

[16] S. Venkatesh and R. M. Buehrer, "A linear programming approach to NLOS error mitigation in sensor networks,", *Proc. IEEE Inf. Process. Sensor Network*, 2006.

[17] G. Destino, D. Macagnano and G. T. F. de Abreu, "Hypothesis testing and iterative WLS minimization for WSN localization under LOS/NLOS conditions," *Proc. IEEE Asilomar Conference on Signals, Systems and Computers*, Nov. 4-7 2007, pp. 2150-2155.

[18] W.-K. Chao and K.-T. Lay, "NLOS measurement identification for mobile positioning in wireless cellular systems," *Proc. IEEE 66th Vehicular Technology Conference (VTC)*, pp. 1965-1969, September 2007.

[19] G. Audrey and G. Julie, "An unscented Kalman filter based maximum likelihood ratio for NLOS bias detection in UMTS localization," *16th Eur. Signal Processing Conf (EUSIPCO)*, 2008.

[20] J. M. Huerta, A. Giremus, J. Vidal and J. Y. Tourneret," Joint particl filter and UKF position tracking under strong NLOS situation," *Proc. IEEE International Statistical Signal Processing*, pp. 537-541, August 2007.

[21] M. Najar, J. M. Huerta, J. Vidal, J. A. Castro, "Mobile location with bias tracking in non-lin-of-sight", *Proc. IEEE International Conf Acoustic, Speech, Signal Proc.*, vol. 3, pp. 956-959, 2004.

[22] S. S. Ghassemzadeh, R. Jana, C. W. Rice, W. Turin and V. Tarokh, "Measurement and modeling of an ultra-wide bandwidth indoor channel," *IEEE Transactions on Communications*, vol. 52, no. 10, pp. 1786-1796, October 2004.

[23] K. Pahlavan, P. Krishnamurthy and A. Beneat, "Wideband radio propagation modeling for indoor geolocation applications," *IEEE Communications Magazine*, vol. 36, no. 4, pp. 60-65, April 1998.

[24] H. Hashemi, "The indoor radio propagation channel," *Proc. of the IEEE*, vol. 81, no. 7, pp. 943-968, July 1993.

[25] T. S. Rappaport, *Wireless Communications: Principles and Practice*, Prentice-Hall, 1996.

[26] N. Alsindi, "Indoor cooperative localization for ultra wideband wireless sensor networks," PhD Dissertation, Worcester Polytechnic Institute, Worcester, Mass., April 2008.

[27] A. Maali, H. Mimoun, G. Baudoin, A. Ouldali, "A new low complexity NLOS identification approach based on UWB energy detection," *Proc. IEEE Radio and Wireless Symposium*, pp. 675-678, San Diego, Calif., USA, January 2009.

[28] I. Guvenc, C.-C. Chong, F. Watanabe, "NLOS identification and mitigation for UWB localization systems," *Proc. IEEE Wireless Communications and Networking Conference (WCNC)*, pp. 1571-1576, March, 2007.

[29] I. Guvenc, C.-C. Chong, NTT DoCoMo, Inc. (2007), Method Line-of-sight (LOS) or non-line-of-sight (NLOS) identification method using multipath channel statistics, U.S. Pat. No. 7,577,445 B2.

[30] S. Venkatesh and R. M. Buehrer, "Non-line-of-sight identification in ultra-wideband systems based on received signal statistics," *IET Microwaves, Antennas and Propagation*, vol. 1, no. 6, pp. 1120-1130, December 2007.

[31] M. Heidari, N. Alsindi and K. Pahlavan, "UDP Identification and error mitigation in TOA-based indoor localization systems using neural network architecture," *IEEE Transactions on Wireless Communications*, vol. 8, no. 7, pp. 3597-3607, July 2009.

[32] J.-Y. Lee, Y.-H. Jo, S.-H. Kang, A.-Y. Kang, D.-H. Ha and S.-J. Yoon, "Determination of the existence of LOS blockage and its application to UWB localization," *Proc. IEEE Military Communications Conference (MILCOM)*, pp. 1-4, Washington D.C., USA, October 2006.

[33] S. Marano, W. M. Gifford, H. Wymeersch and M. Z. Win, "NLOS identification and mitigation for localization based on UWB experimental data," *IEEE Journal on Selected Areas in Communications*, vol. 28, no. 7, pp. 1026-1035, September 2010.

[34] L. Mucchi and P. Marcocci, "A new parameter for channel identification in UWB indoor environments," *Proc. 16th International Conference on Computer Communications and Networks*, pp. 419-423, Honolulu, Hi., USA, August 2007.

[35] S. Marano, W. M. Gifford, H. Wymeersch, M. Z. Win, MIT, (2009), Method and system for identification and mitigation of errors in non-line-of-sight distance estimation, U.S. patent application Ser. No. 12/383,939.

[36] C. E. Shannon, "A mathematical theory of communication," *Bell Syst. Tech. J.*, vol. 27, pp. 379-423; 623-656, July/October 1948[Online] Available http://cm.bell-labs.com/cm/ms/what/shannonday/paper.html.

[37] B. Alavi, K. Pahlavan, "Modeling of the distance error for indoor geolocation," in *Proceedings of IEEE Wireless Communications and Networking (WCNC)*, pp. 668-672, vol. 1, New Orleans, La., USA, March 2003.

[38] R. Moddemeijer, "On estimation of entropy and mutual information of continuous distributions," *Signal Processing*, vol. 16, no. 3, pp. 233-246, 1989.

[39] P. Hall and S. Morton, "On the estimation of entropy," *Ann. Inst. Stat. Math.*, vol. 45, pp. 69-88, 1993.

[40] 0. Vasicek, "A test of normality based on sample entropy," *J. R. Stat. Soc. Ser. B*, vol. 38, pp. 54-59, 1976.

[41] J. C. Correa, "A new estimator of entropy," *Commun. Stat.-Theory Methodol.*, vol. 24, pp. 2439-2449, 1995.

[42] P. Viola, N. N. Schraudolph and T. J. Sejnowski, "Empirical entropy manipulation for real-world problems," in *Advances in Neural Information Processing Systems* 8. Cambridge, Mass.: MIT Press, 1996.

[43] D. T. Pham, "Blind separation of instantaneous mixture of sources via an independent component analysis," *IEEE Trans. Signal Processing*, vol. 44, pp. 2768-2779, November 1996.

[44] J.-F. Bercher, C. Vigant, "Estimating the entropy of a signal with applications", *IEEE Trans. on Signal Processing*, vol. 48, no. 6, pp. 1687-1694, June 2000.

[45] S. Kay, "Model-based probability density function estimation," *IEEE Signal Processing Letters*, vol. 5, no. 12, December 1998.

[46] M. H. Hayes, *Statistical Digital Signal Processing and Modeling*, John Wiley & Sons, Inc., 1996.

[47] G. Kitagawa and W. Gersh, "A smoothness priors long AR model method for spectral estimation," *IEEE Trans. Automat. Contrl.*, vol. AC-30, pp. 57-65, 1985.

[48] J.-F. Giovannelli, G. Demoment and A. Herment, "A Bayesian method for long AR spectra estimation: A Comparative study," *IEEE Trans. Ultrason. Freq. Ferroelect.*, vol. 43, pp. 220-233, March 1996.

[49] S. M. Kay, *Fundamentals of Signal Processing Volume II: Detection Theory*, Prentice Hall,

[50] H. L. Van Trees, *Detection, Estimation, and Modulation, Part I: Detection, Estimation, and Linear Modulation Theory*, John Wiley & Sons, Inc., 2001.

[51] F. Gini, A. Farina and M. S. Greco, "Radar detection and preclassification based on multiple hypothesis testing," *IEEE Transactions on Aerospace and Electronic Systems*, vol. 40, no. 3, pp. 1046-1059.

All references referred to are hereby incorporated by reference.

The invention claimed is:

1. A method of identifying the transmission channel condition of a signal received by a receiver of a mobile device, the method including the steps of:

receiving said signal from a transmitter of a communication network provider, wherein said transmitter is in a known location, and wherein said signal includes signal information which is provided with said signal by said communication network provider;

identifying, via said mobile device, arrival information of said signal;

determining, via a processor of said mobile device, signal location information from at least one of said signal information and said arrival information;

estimating an entropy of a channel impulse response of said signal; and determining a channel condition from the estimated entropy, wherein possible channel conditions for the channel condition are said signal including components that have traversed a direct path and non-direct paths, and said signal including components that have traversed non-direct paths only.

2. A method according to claim 1, wherein the method further includes the steps of,
   determining whether the signal is received through a non-line of sight channel based on said signal time information; and
   if the signal is received through a non-line of sight channel, determining from the estimated entropy, whether the signal includes a direct path element which is attenuated or if the signal does not include a direct path element.

3. A method according to claim 1 wherein the step of determining whether said signal consists of components that have traversed a direct path and non-direct paths or consists of components that have traversed non-direct paths only includes the step of, comparing said estimated entropy to a known probability distribution function of entropy for each possible channel condition.

4. A method according to claim 3 wherein the step of comparing takes account of known likelihoods of the transmission by each of the possible channel conditions.

5. A method according to claim 1 wherein the step of determining includes the steps of:
   starting from a null hypothesis that the signal consists only of components that have traversed non-direct paths and applying a Neyman-Pearson (NP) hypothesis test to the estimated entropy to determine whether a direct path component is present or not; and
   if a direct path component is present, applying a binary Bayesian test to the estimated entropy to determine whether the direct path component is attenuated or not.

6. A method of locating a mobile device having a receiver, the method including the steps of:
   receiving, via said receiver, a signal from a transmitter of a communication network provider, wherein said transmitter is in a known location;
   identifying, via a processor of said mobile device, signal location information from said signal, said signal location information including at least one of time of arrival, time difference of arrival, angle of arrival, and received signal strength;
   estimating an entropy of a channel impulse response of said signal;
   determining a channel condition from the estimated entropy, wherein possible channel conditions for the channel condition are said signal including components that have traversed a direct path and non-direct paths, and said signal including components that have traversed non-direct paths only; and
   determining a location of the mobile device using the determined channel condition, the known location, and the signal location information.

7. A method according to claim 6 wherein the method further includes the steps of:
   determining whether the signal is received through a non-line of sight channel based on said signal time information; and
   if the signal is received through a non-line of sight channel, determining from the estimated entropy, whether the signal includes a direct path element which is attenuated or if the signal does not include a direct path element.

8. A method according to claim 6 wherein the step of determining whether said signal consists of components that have traversed a direct path and non-direct paths or consists of components that have traversed non-direct paths only includes the step of, comparing said estimated entropy to a known probability distribution function of entropy for each possible channel condition.

9. A method according to claim 8 wherein the step of comparing takes account of known likelihoods of the transmission by each of the possible channel conditions.

10. A method according to claim 6 wherein the step of determining includes the steps of:
    starting from a null hypothesis that the signal consists only of components that have traversed non-direct paths and applying a Neyman-Pearson (NP) hypothesis test to the estimated entropy to determine whether a direct path component is present or not; and
    if a direct path component is present, applying a binary Bayesian test to the estimated entropy to determine whether the direct path component is attenuated or not.

11. A method according to claim 6 wherein the method further includes using the estimated entropy to adjust a measurement of distance between the transmitter and the mobile device.

12. A mobile device having a receiver and a control unit, wherein:
    the receiver is arranged to receive a signal from a transmitter of a communication network provider, wherein said transmitter is in a known location; and
    the control unit is arranged to:
    identify signal location information from said signal, said signal location information including at least one of time of arrival, time difference of arrival, angle of arrival, and received signal strength;
    estimate an entropy of a channel impulse response of said signal;
    determining a channel condition from the estimated entropy, wherein possible channel conditions for the channel condition are said signal including components that have traversed a direct path and non-direct paths, and said signal including components that have traversed non-direct paths only; and
    determine a location of the mobile device using the determined channel condition, the known location, and the signal location information.

13. A mobile device according to claim 12 wherein the control unit is further arranged to:
    determine whether the signal is received through a non-line of sight channel based on said signal time information; and
    if it determines that the signal is received through a non-line of sight channel, determine from the estimated entropy whether the signal includes a direct path element which is attenuated or if the signal does not include a direct path element.

14. A mobile device according to claim 12 wherein in determining whether said signal consists of components that have traversed a direct path and non-direct paths or consists of components that have traversed non-direct paths only, the control unit compares said estimated entropy to a known probability distribution function of entropy for each possible channel condition.

15. A mobile device according to claim 14 wherein in comparing said estimated entropy, the control unit takes account of known likelihoods of the transmission by each of the possible channel conditions.

16. A mobile device according to claim 12 wherein the control unit is arranged to determine the transmission path by:
    starting from a null hypothesis that the signal consists only of components that have traversed non-direct paths and applying a Neyman-Pearson (NP) hypothesis test to the estimated entropy to determine whether a direct path component is present or not; and if a direct path component is present, applying a binary Bayesian test to the estimated entropy to determine whether the direct path component is attenuated or not.

17. A mobile device according to claim 12 wherein the control unit is further arranged to use the estimated entropy to adjust a measurement of distance between the transmitter and the mobile device.

18. A mobile device according to claim 12, further including a display, wherein the control unit is arranged to display the determined location of the mobile device.

19. A mobile device according to claim 12, further including a transmitter, wherein the control unit is arranged to transmit the determined location of the mobile device.

20. A method according to claim 1, wherein said signal information is a signal sending time, wherein said arrival information is a signal arrival time, and wherein said signal location information is at least one of time of arrival, time difference of arrival, and angle of arrival.

21. A method according to claim 20, wherein said signal location information includes received signal strength.

22. The method of claim 6, wherein said signal location information is provided at least in part by said communication network provider.

\* \* \* \* \*